(12) United States Patent
Cho

(10) Patent No.: US 12,198,684 B2
(45) Date of Patent: Jan. 14, 2025

(54) ELECTRONIC DEVICE AND METHOD FOR SHARING EXECUTION INFORMATION ON USER INPUT HAVING CONTINUITY

(71) Applicant: Samsung Electronics Co., Ltd., Suwon-si (KR)

(72) Inventor: Jungkeun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 17/863,947

(22) Filed: Jul. 13, 2022

(65) Prior Publication Data

US 2022/0351719 A1 Nov. 3, 2022

Related U.S. Application Data

(63) Continuation of application No. PCT/KR2021/019529, filed on Dec. 21, 2021.

(30) Foreign Application Priority Data

Dec. 23, 2020 (KR) .................. 10-2020-0182246

(51) Int. Cl.
*G10L 15/22* (2006.01)
*G10L 15/18* (2013.01)
*G10L 15/183* (2013.01)

(52) U.S. Cl.
CPC ........ *G10L 15/183* (2013.01); *G10L 15/1822* (2013.01); *G10L 15/22* (2013.01); *G10L 2015/223* (2013.01)

(58) Field of Classification Search
CPC .................. G10L 15/22; G10L 15/30
See application file for complete search history.

(56) References Cited

U.S. PATENT DOCUMENTS

| 10,068,028 | B1 | 9/2018 | Hendriks |
| 10,699,704 | B2 | 6/2020 | Kim et al. |
| 10,911,910 | B2 | 2/2021 | Park et al. |
| 2015/0312236 | A1 | 10/2015 | Ducker et al. |

(Continued)

FOREIGN PATENT DOCUMENTS

| KR | 10-2019-0127372 A | 11/2019 |
| KR | 10-2020-0017290 A | 2/2020 |

(Continued)

*Primary Examiner* — Jialong He
(74) *Attorney, Agent, or Firm* — Jefferson IP Law, LLP

(57) ABSTRACT

An electronic device and method for sharing execution information on a user input having continuity thereof are provided. The electronic device includes a processor configured to, recognize a user intent by analyzing the user input, execute a function and/or action corresponding to the user intent and provide an execution result through the display, store the user input in the memory, in response to a sharing request of the user input, classify a type of the user input requested to be shared, if the classification result shows that the user input requested to be shared is a user input related to a previous user input pre-stored in the memory, generate execution information, based on the at least one previous user input and the user input requested to be shared, and transmit the generated execution information to another electronic device through the communication module. Various other embodiments are also possible.

20 Claims, 13 Drawing Sheets

(56) References Cited

U.S. PATENT DOCUMENTS

| | | | |
|---|---|---|---|
| 2019/0051298 A1 | 2/2019 | Lee et al. | |
| 2019/0267001 A1* | 8/2019 | Byun | G10L 15/18 |
| 2019/0325872 A1 | 10/2019 | Song et al. | |
| 2019/0342727 A1* | 11/2019 | Park | G10L 17/24 |
| 2020/0051559 A1 | 2/2020 | Park et al. | |
| 2020/0051563 A1 | 2/2020 | Oh et al. | |
| 2020/0258520 A1 | 8/2020 | Suh et al. | |
| 2020/0349947 A1 | 11/2020 | Kim et al. | |
| 2020/0395012 A1* | 12/2020 | Kim | G10L 15/30 |
| 2021/0343283 A1* | 11/2021 | Choi | G06F 3/167 |

FOREIGN PATENT DOCUMENTS

| | | | | |
|---|---|---|---|---|
| KR | 10-2020-0052612 A | | 5/2020 | |
| KR | 10-2020-0079081 A | | 7/2020 | |
| KR | 10-2020-0099036 A | | 8/2020 | |
| WO | WO 2020/091183 | * | 5/2020 | G10L 15/22 |

\* cited by examiner

US 12,198,684 B2

ELECTRONIC DEVICE AND METHOD FOR SHARING EXECUTION INFORMATION ON USER INPUT HAVING CONTINUITY

TECHNICAL FIELD

The disclosure relates to an electronic device and method for sharing execution information on a user input having continuity thereof.

BACKGROUND ART

Electronic devices (e.g., a mobile terminal, a smartphone, or a wearable terminal) may provide various functions. For example, the electronic device may provide an image capture function, a music playback function, a navigation function, a telephony function, a short-range wireless communication (e.g., Bluetooth, wireless fidelity (Wi-Fi), Near Field Communication (NFC)) function, an electronic payment function, or a speech recognition function.

For example, upon receiving a user's voice command, the electronic device may recognize the received voice command through the speech recognition function (e.g., a speech recognition assistant application), execute a function corresponding to a recognition result, and provide an execution result. The electronic device may provide a sharing function for the execution result. When the execution result is shared with a different user, the electronic device may transmit link information (e.g., deep-link) together so that the different user can execute a corresponding command.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When a plurality of voice commands are input, an electronic device may generate link information, based on a user's initial voice command (or last voice command). For example, the electronic device may provide a search result for today's weather (hereinafter, referred to as a first execution result) in response to reception of a first voice command such as "What's the weather today?" and then provide a search result for tomorrow's weather (hereinafter, a second execution result) in response to reception of a second voice command such as "How about tomorrow?". When there is a request to share the second execution result, the electronic device may generate the link information, based on the first voice command "What's the weather today?", despite the request to share the second execution result. Therefore, the electronic device may transmit the link information not related to the execution result to a different user. For example, the electronic device may transmit (share) link information on the first voice command not related to the second execution result to the different user. Upon receiving the link information, an electronic device of the different user may provide the first execution result instead of the second execution result. The electronic device may provide execution information against a user's intent.

As another example, when there is a request to share the second execution result, the electronic device may generate link information, based on the second voice command "How about tomorrow?", and transmit (share) it to the different user. Upon receiving the link information, the electronic device of the different user may execute a function corresponding to the second voice command "How about tomorrow?" when the link information is executed. In this case, the electronic device of the different user may provide a third execution result different from the second execution result (the search result for tomorrow's weather), or may notify that the second voice command "How about tomorrow?" cannot be executed (e.g., may output a text and/or voice such as "Sorry, I'm having trouble understanding right now"). As such, the electronic device may provide execution information to the different user against a user's intent.

Aspects of the disclosure are to address at least the above-mentioned problems and/or disadvantages and to provide at least the advantages described below. Accordingly, an aspect of the disclosure is to provide an electronic device capable of generating execution information by considering continuous user inputs when an execution result of a user input having continuity (e.g., a voice command and/or a text command) is shared, and a method of sharing the execution information on the user input having continuity.

Additional aspects will be set forth in part in the description which follows and, in part, will be apparent from the description, or may be learned by practice of the presented embodiments.

Solution to Problem

In accordance with an aspect of the disclosure, an electronic device, is provided. The electronic device includes a communication module, a display, at least one processor operatively coupled with the communication module and the display, and a memory operatively coupled with the at least one processor. The memory may store instructions, when executed, causing the at least one processor to, in response to a user input, recognize a user intent by analyzing the user input, execute a function and/or action corresponding to the user intent and provide an execution result through the display, store the user input in the memory, in response to a sharing request of the user input, classify a type of the user input requested to be shared, if the classification result shows that the user input requested to be shared is a user input (hereinafter, a continuous input) related to at least one previous user input pre-stored in the memory, generate execution information, based on the at least one previous user input and the user input requested to be shared, and transmit the generated execution information to at least one different electronic device through the communication module.

In accordance with another aspect of the disclosure, a method of sharing execution information on a user input having continuity of an electronic device is provided. The method includes in response to a user input, recognizing a user intent by analyzing the user input, executing a function and/or action corresponding to the user intent and providing an execution result through a display, storing the user input in a memory, in response to a sharing request of the user input, classifying a type of the user input requested to be shared, if the classification result shows that the user input requested to be shared is a user input (hereinafter, a continuous input) related to at least one previous user input pre-stored in the memory, generating execution information, based on the at least one previous user input and the user input requested to be shared, and transmitting the generated execution information to at least one different electronic device through a communication module.

Advantageous Effects of Invention

Various embodiments of the disclosure can solve a problem in that, when execution information (e.g., an execution result and/or link information) on a user input having continuity (e.g., a voice command and/or a text command) is shared, an execution result using the link information and the shared execution result are different. For example, various embodiments of the disclosure can provide the same execution result as an execution result shared by an electronic device when the link information is executed in another electronic device with which the execution information is shared. The electronic device according to various embodiments can edit an instruction included in the execution information. Therefore, the electronic device can share more accurate execution information to other users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

BEST MODE FOR CARRYING OUT THE INVENTION

Figure 1:
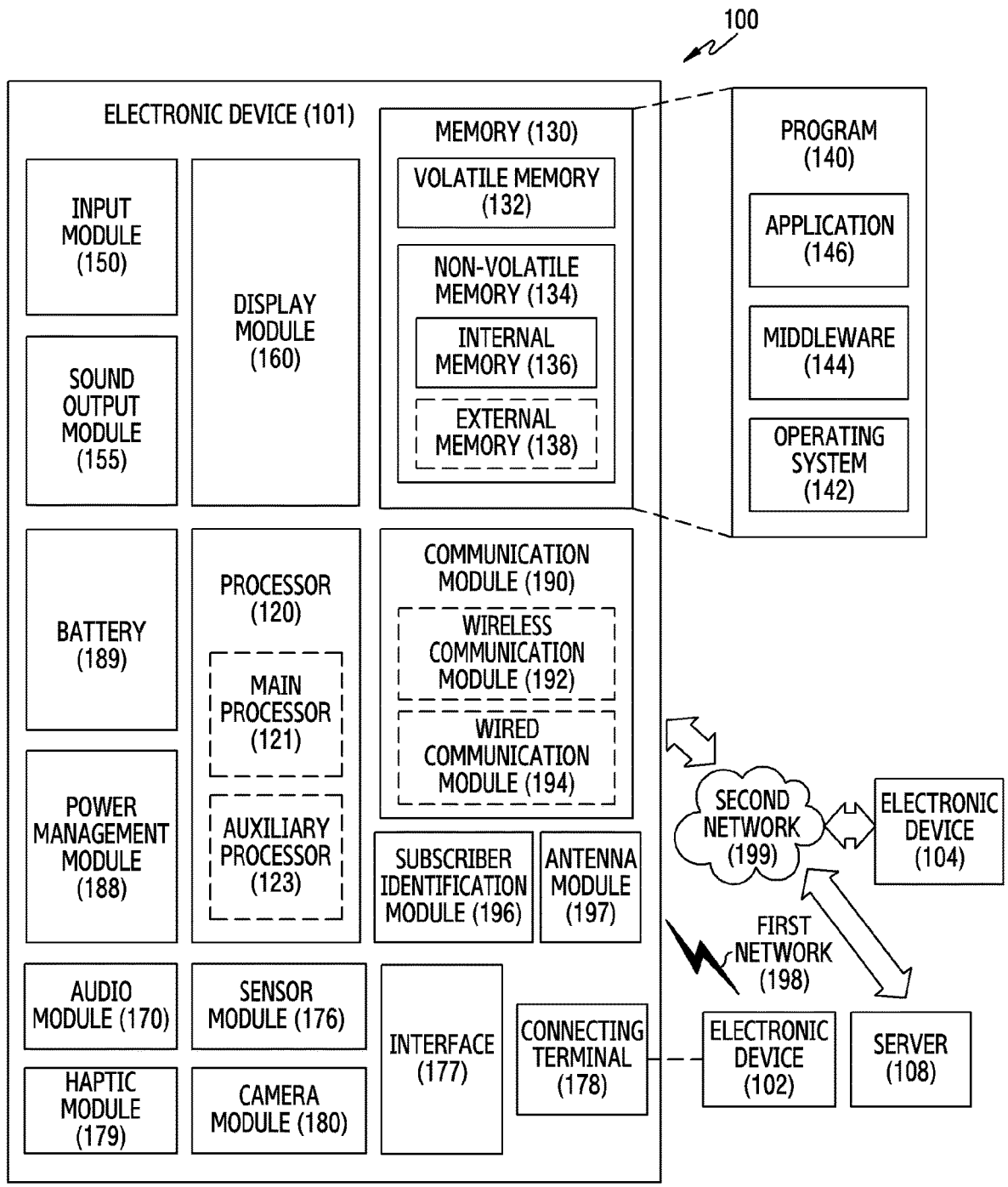
FIG. 1 is a block diagram illustrating an electronic device 101 in a network environment 100 according to various embodiments.

Hereinafter, various embodiments of the disclosure are described with reference to the accompanying drawings. Specific embodiments have been shown by way of example in the drawings and will be described in detail in the disclosure. It should be understood, however, that it is not intended to limit the various embodiments of the disclosure to a particular form. For example, it is apparent to those ordinarily skilled in the art that the embodiments of the disclosure can be modified in various manners.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
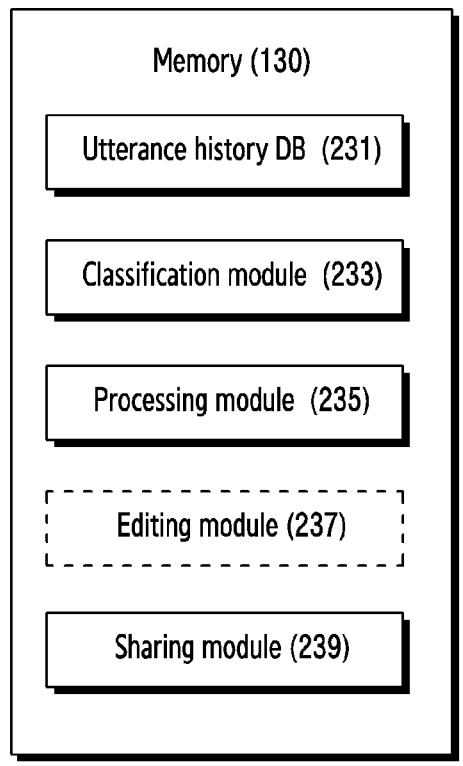
FIG. 2 illustrates a configuration of a memory of FIG. 1 according to an embodiment of the disclosure.

FIG. 2 illustrates a configuration of the memory of FIG. 1 according to an embodiment of the disclosure.

Referring to FIG. 2, the memory 130 according to various embodiments of the disclosure may include an application which receives a user's input (e.g., a voice input and/or a text input), recognizes a user's intent through the received user input, and provides a service (e.g., a function or an action) corresponding to the recognized user's intent. For example, the application may execute and operate at least one of various applications included in the electronic device 101, based on the user input. The application may include a speech recognition assistant application such as Bixby™ Google Assistant™, Siri™, Alexa™, or Nugu™.

The user input may include, for example, a physical button, a touch pad, a voice input, or a remote input. Hereinafter, for convenience of explanation, it is assumed, for example, that the user input is a voice input (utterance) and the application is a speech recognition assistant application which receives the voice input (utterance) to provide a service.

According to an embodiment, the application may provide a sharing function. For example, the application may transmit execution information (e.g., an execution result, an instruction (or keyword), and/or link information (e.g., deep-link)) based on at least one utterance of the user to another electronic device.

According to an embodiment, the memory 130 may include an utterance history DataBase (DB) 231, a classification module 233, a processing module 235, an editing module 237, and/or a sharing module 239.

According to an embodiment, the utterance history DB 231 may store a user's utterance history. For example, the utterance history DB 231 may store at least one utterance detected until a termination event (e.g., a sharing request, a termination of a speech recognition assistant application) after detection of the utterance. As another example, the utterance history DB 231 may store at least one utterance detected during a specified period.

According to an embodiment, the utterance history DB 231 may store a variety of information including "service ID (serviceId)", "device type", "conversation ID (conversationId)", "domain name (capsuleName)", "domain ID (capsuleId)", "Natural Language Generation(NLG)", "reference request ID (referenceRequestId)(=previous request ID (PriorRequestId))", "request ID(requestId)", "utterance", "device locale (deviceLocale)", "time stamp (timeStamp)", "time zone(timeZone)", and/or "renderer type" for each utterance. Information related to each utterance stored in the utterance history DB 231 of Table 1 below is described by taking Bixby™ for example, but the disclosure is not limited thereto.

TABLE 1

| information | description |
| --- | --- |
| serviceId | ID of food recognition assistant application |
| device type | Type of electronic device (tablet, mobile phone, etc.) |
| conversationId | Created based on the screen. If the screen is maintained, it has the same conversation ID. |
| capsuleName | The name of the application that executes(processes) the command corresponding to the utterance. |

TABLE 1-continued

| information | description |
| --- | --- |
| capsuleId | ID of the application that executes (processes)the command corresponding to the utterance |
| NLG | Information from the module that converts speech to text |
| referenceRequestid | The request ID of the previous utterance. |
| requestId | ID generated for each utterance to distinguish each utterance |
| utterance | User's voice detected through microphone |
| deviceLocale | Information on where the electronic device is located |
| timeStamp | time at which utterance was detected |
| timeZone | Information on the time zone in which the electronic |
| Renderer Type | Type of webview that shows utterance results |

According to some embodiments, the utterance history DB 231 may be included (or backed up) in a server (e.g., the server 108).

According to an embodiment, the classification module 233 may classify a type of an utterance requested to be shared when sharing is requested. For example, the classification module 233 may classify the type of the utterance requested to be shared, based on an utterance history stored (or accumulated) until the sharing is requested. The type of the utterance may include a general utterance (or a single utterance) not related to a previous utterance (or having no continuity with the previous utterance) or a continuous utterance related to the previous utterance (or having continuity with the previous utterance). The continuous utterance may include a prompt utterance requiring an input of additional information and a follow-up utterance not requiring the input of additional information. The classification module 233 will be described below in detail with reference to FIG. 4.

According to an embodiment, the processing module 235 may generate execution information by analyzing the accumulated utterances related to the utterance requested to be shared. The execution information may include an execution result, an instruction (or a keyword), and/or link information (e.g., deep-link). A method of generating the execution information of the processing module 235 will be described below in detail with reference to FIG. 5 to FIG. 8B.

According to an embodiment, the editing module 237 may perform editing (e.g., modification, deletion, or order change) on instructions generated by the processing module 235, based on the user input. For example, the editing module 237 may display the instructions generated by the processing module 235 on a screen before generating the execution information, and may perform editing (e.g., modification, deletion, or order change), based on the user input.

According to an embodiment, the sharing module 239 may share the execution information. For example, in case of a single utterance, the sharing module 239 may transmit, to a different electronic device, execution information (first execution information) generated based on a current utterance requested to be shared. As another example, in case of a continuous utterance, the sharing module 239 may transmit, to the different electronic device, execution information (second execution information) generated based on the current utterance requested to be shared and at least one related previous utterance.

Although it is illustrated and described above in FIG. 2 that the classification module 233, the processing module 235, the editing module 237, and the sharing module 239 are software modules stored in the memory 130, at least part of the classification module 233, the processing module 235, the editing module 237, and/or the sharing module 239 may be implemented as a hardware-based module. For example, at least part of the classification module 233, the processing module 235, the editing module 237, and/or the sharing module 239 may be included in the processor 120, or may be included in the electronic device 101 as a separate configuration. As another example, the classification module 233, the processing module 235, the editing module 237, and/or the sharing module 239 may be implemented by the processor 120. Hereinafter, functions of the classification module 233, the processing module 235, the editing module 237, and/or the sharing module 239 will be described as operations of the processor 120.

Figure 3:
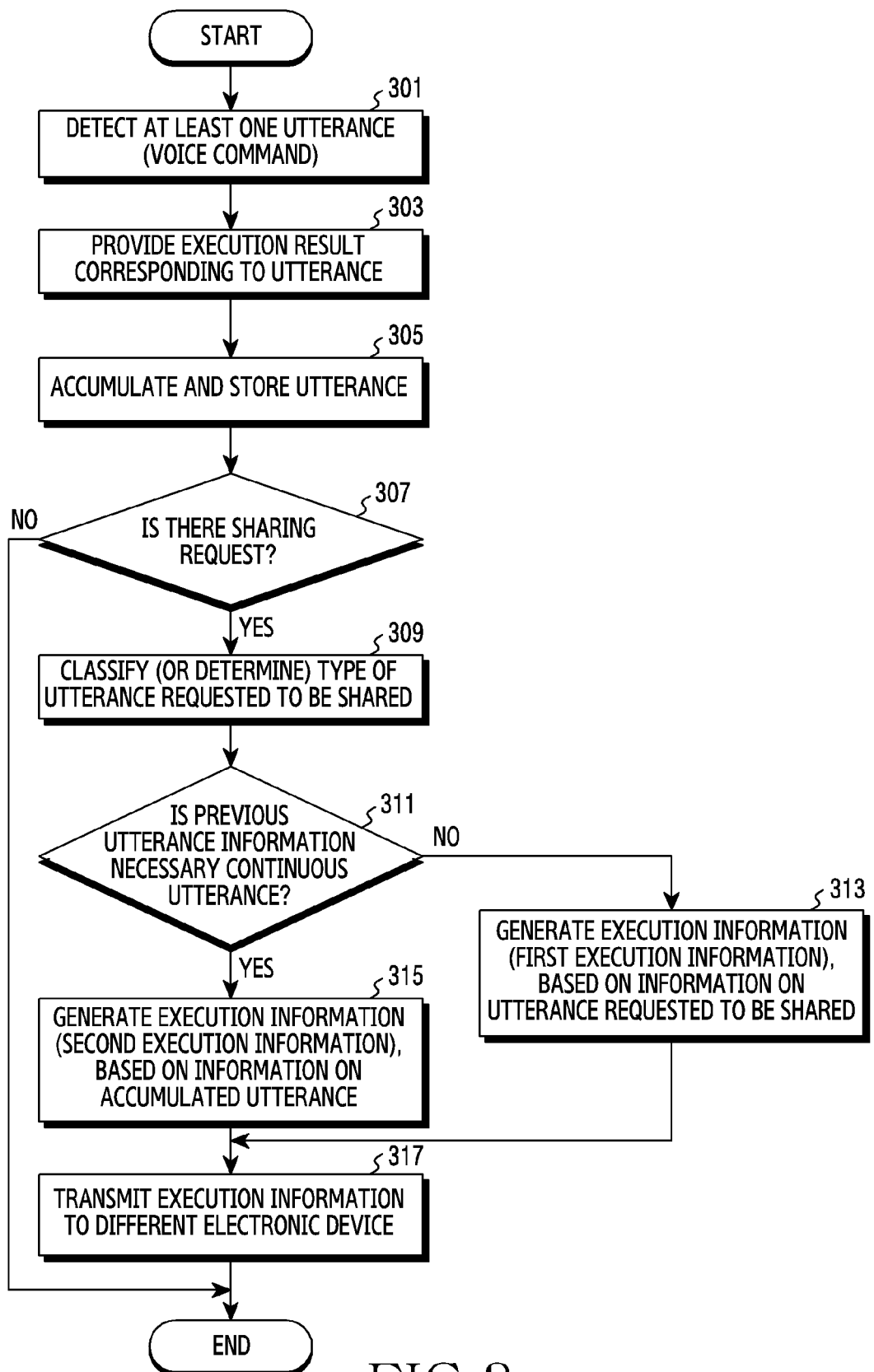
FIG. 3 is a flowchart illustrating a method of sharing execution information of an electronic device according to an embodiment of the disclosure.

FIG. 3 is a flowchart illustrating a method of sharing execution information of an electronic device according to an embodiment of the disclosure.

Referring to FIG. 3, in operation 301, a processor (e.g., the processor 120 of FIG. 1) of an electronic device (e.g., the electronic device 101 of FIG. 1) according to an embodiment of the disclosure may detect at least one utterance (a voice command). For example, when a speech recognition assistant application is executed, the processor 120 may activate a microphone, and may detect at least one utterance which is input through the microphone. The speech recognition assistant application may be executed by a specified key (e.g., a hardware or software key) input or a voice input.

According to an embodiment, in operation 303, the processor 120 may provide an execution result corresponding to an utterance. For example, the processor 120 may convert the utterance into a text through speech recognition (e.g., automatic speech recognition), analyze the converted text (Natural Language Understanding (NLU)) to recognize a user's intent, execute a function based on the user's intent (e.g., searching for today's weather), and display an execution result (e.g., a search result for the today's weather) on a display (e.g., the display module 160) and/or output it through a speaker (e.g., the sound output module 155). According to some embodiments, the processor 120 may transmit a user's utterance to a server (e.g., the server 108 of FIG. 1), and may receive necessary information for executing a function (or an action) corresponding to the user's utterance (hereinafter, function execution information) from the server. The function execution information may include a domain indicating an application for executing the function corresponding to the user's utterance, a user's intent, and/or a parameter required to express the intent. For example, when a user requests to set an alarm at a specific time (e.g., when the user utters "Set the alarm for 7 o'clock"), the domain may include an alarm application, the intent may include adding an alarm, and the parameter may include a specific time (e.g., 7 o'clock). The processor 120 may perform a function corresponding to the utterance (e.g., perform the alarm application to set the alarm for 7 o'clock), based on the received function execution information.

According to some embodiments, the processor 120 may request to provide necessary information for recognizing the user's intent or for performing a function (hereinafter, additional information). For example, the processor 120 may output a message which requests to provide the necessary information through a display or may output an audio signal which requests to provide the necessary information through the speaker.

According to an embodiment, in operation 305, the processor 120 may accumulate and store the utterance. For example, the processor 120 may store at least one detected utterance in an utterance history DB (e.g., the utterance history DB 231 of FIG. 2). According to an embodiment, the accumulation of the utterance may be performed until a termination event occurs.

According to an embodiment, in operation 307, the processor 120 may identify whether sharing is requested. For example, the processor 120 may identify whether a sharing menu included in an execution result screen is selected (e.g., touched).

If the identification result of operation 307 shows that the sharing is not requested, the processor 120 may end the sharing procedure of the execution information. Otherwise, if the identification result of operation 307 shows that the sharing is requested, in operation 309, the processor 120 may classify (or determine) a type of an utterance requested to be shared. For example, the processor 120 may classify the utterance requested to be shared into a general utterance, a follow-up utterance, or a prompt utterance, based on a relationship of accumulated previous utterances. The classification method will be described below in detail with reference to FIG. 4.

According to an embodiment, in operation 311, the processor 120 may identify whether the utterance requested to be shared is a continuous utterance (e.g., the follow-up utterance or the prompt utterance) which requires previous utterance information. For example, the processor 120 may identify whether the utterance requested to be shared is the continuous utterance (e.g., the follow-up utterance or the prompt utterance), based on the classification result.

If the identification result of operation 311 shows that the utterance requested to be shared is not the continuous utterance (e.g., if it is a single utterance), in operation 313, the processor 120 may generate execution information (hereinafter, first execution information), based on information on the utterance requested to be shared, and may proceed to operation 317 described below. The first execution information may include an execution result screen (e.g., a capture screen), a first instruction corresponding to utterance information, and/or link information (e.g., deeplink) capable of executing the first instruction.

If the identification result of operation 311 shows that the utterance requested to be shared is the continuous utterance (e.g., if it is the follow-up utterance or the prompt utterance), in operation 315, the processor 120 may generate execution information (hereinafter, second execution information), based on information on the accumulated utterance. For example, the processor 120 may generate a second instruction, based on the accumulated previous utterance and the utterance requested to be shared. A method of generating the second instruction for the continuous utterance will be described in detail with reference to FIG. 5. The second execution information may include an execution result screen, the second instruction, and/or link information capable of executing the second instruction.

According to an embodiment, in operation 317, the processor 120 may transmit the execution information to a different electronic device. For example, the processor 120 may transmit the execution information to at least one different electronic device specified or selected by a user, through a communication module (e.g., the communication module 190 of FIG. 1). The processor 120 may transmit the execution information by using various means (e.g., a text message, an instant message, an e-mail, or short-range wireless communication).

Figure 4:
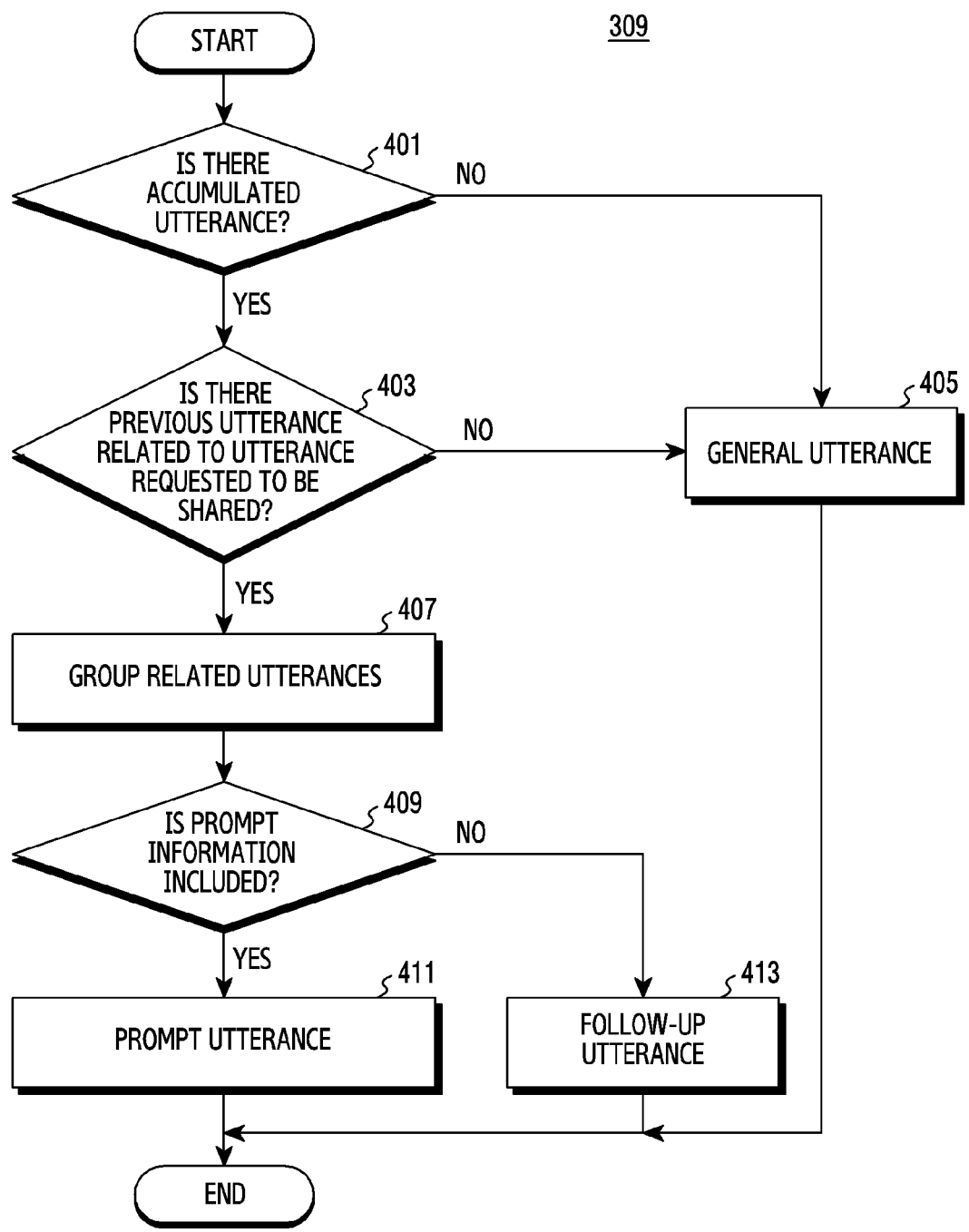
FIG. 4 is a flowchart illustrating a method of classifying an utterance type of an electronic device according to an embodiment of the disclosure.

FIG. 4 is a flowchart illustrating a method of classifying an utterance type of an electronic device according to an embodiment of the disclosure.

Referring to FIG. 4, in operation 401, a processor (e.g., the processor 120 of FIG. 1, the classification module 233 of FIG. 2) of an electronic device (e.g., the electronic device 101 of FIG. 1) according to an embodiment of the disclosure may identify whether there is an accumulated utterance. For example, the processor 120 may identify whether there is the accumulated utterance, based on an utterance history stored in an utterance history DB (e.g., the utterance history DB 231 of FIG. 2). If the identification result of operation 401 shows that there is no accumulated utterance, the processor 120 may proceed to operation 405 described below. Otherwise, if the identification result of operation 401 shows that there is the accumulated utterance, in operation 403, the processor 120 may identify whether there is at least one previous utterance related to an utterance requested to be shared. For example, the processor 120 may identify whether there is at least one previous utterance by using some information (e.g., a domain and a previous request ID) among information related to the utterance requested to be shared. For example, if the utterance requested to be shared and a previous utterance corresponding to the previous request ID are utterances to be processed in the same domain, the processor 120 may determine that the utterance requested to be shared and the previous utterance are related to each other.

According to some embodiments, the processor 120 may identify whether there is a previous utterance related to the utterance requested to be shared, by using a reference request ID of the utterance requested to be shared. According to an embodiment, the reference request ID may be provided from a server (e.g., the server 108) to the electronic device. For example, upon detecting the utterance, the electronic device may transmit to the server the request ID of the utterance and the previous request ID for the previous utterance. The server may identify whether the utterance and the previous utterance are executed (processed) in the same domain, and if they are executed in the same domain, may transmit the previous request ID to the electronic device as the reference request ID. If they are not executed in the same domain, the server may transmit a null value to the electronic device as the reference request ID. Accordingly, the processor 120 may determine that there is the previous utterance related to the utterance requested to be shared if there is the reference request ID of the utterance requested to be shared, and may determine that there is no previous utterance related to the utterance requested to be shared if the reference request ID of the utterance requested to be shared has the null value.

If the identification result of operation 403 shows that there is no previous utterance related to the utterance requested to be shared, in operation 405, the processor 120 may classify the utterance requested to be shared into a general utterance. For example, if the reference request ID of the utterance requested to be shared has the null value, the processor 120 may classify the utterance requested to a shared into the general utterance.

If the identification result of operation 403 shows that there is at least one previous utterance related to the utterance requested to be shared, in operation 407, the processor 120 may group the related utterances. For example, if 10 utterances (e.g., a $1^{st}$ utterance to a $10^{th}$ utterance) are accumulated in the utterance history DB and if the $10^{th}$ utterance requested to be shared is related to the $7^{th}$ to $9^{th}$ utterances, the processor 120 may group the $7^{th}$ to $10^{th}$ utterances.

According to an embodiment, the processor 120 may determine an utterance order of grouped utterances and an initial utterance (or a root utterance), based on a request ID and reference request ID of each utterance. For example, the processor 120 may determine an utterance having the same request ID as a reference request ID of a specified utterance as a previous utterance of the specified utterance, and may determine the utterance as an initial utterance of a group when a reference request ID of the previous utterance has a null value. In other words, the processor 120 may determine the $9^{th}$ utterance as a previous utterance of the $10^{th}$ utterance if a reference request ID of the 10th utterance requested to be shared is the same as a request ID of the $9^{th}$ utterance, may determine the $8^{th}$ utterance as a previous utterance of the $9^{th}$ utterance if a reference request ID of the 9th utterance is the same as a request ID of the 8th utterance, may determine the $7^{th}$ utterance as a previous utterance of the $8^{th}$ utterance if a reference request ID of the 8th utterance is the same as a request ID of the 7th utterance, and may determine the 7th utterance as an initial utterance of a group since a reference request ID of the 7th utterance has a null value. Herein, the grouped utterances may have the same information regarding a service ID, a device type, a conversation ID, a domain name, a domain ID, a device locale, and a time zone. Although Bixby™ is taken for example herein, the disclosure is not limited thereto.

According to some embodiments, the processor 120 may use timestamp information of each utterance so that the utterance requested to be shared is grouped with at least one previous utterance uttered with a specified time (e.g., 5 minutes) with respect to the utterance requested to be shared.

According to an embodiment, in operation 409, the processor 120 may identify whether the grouped utterances include prompt information. The prompt information may be information indicating that a current utterance is additional information requested to process the previous utterance. According to some embodiments, in operation 409, the processor 120 may identify a renderer type of the grouped utterance. The renderer type may include a first type (e.g., a result type) and a second type (e.g., a prompt type), as a value which defines a type of a web view showing an execution result. The first type (e.g., the result type) may include a result list (resultList) and a result detail (resultDetail), and the second type (e.g., the prompt type) may include a value prompt (valuePrompt) and a confirmation prompt (confirmationPrompt).

If the identification result of operation 409 shows that the grouped utterances include the prompt information, in operation 411, the processor 120 may classify the utterance requested to be shared into the prompt utterance. According to some embodiments, if the renderer type is the prompt type, the processor 120 may classify it into the prompt utterance. If the identification result of operation 409 shows that the grouped utterances do not include the prompt information, in operation 413, the processor 120 may classify the utterance requested to be shared into the follow-up utterance. According to some embodiments, if the renderer type is the result type, the processor 120 may classify it into the follow-up utterance.

Figure 5:
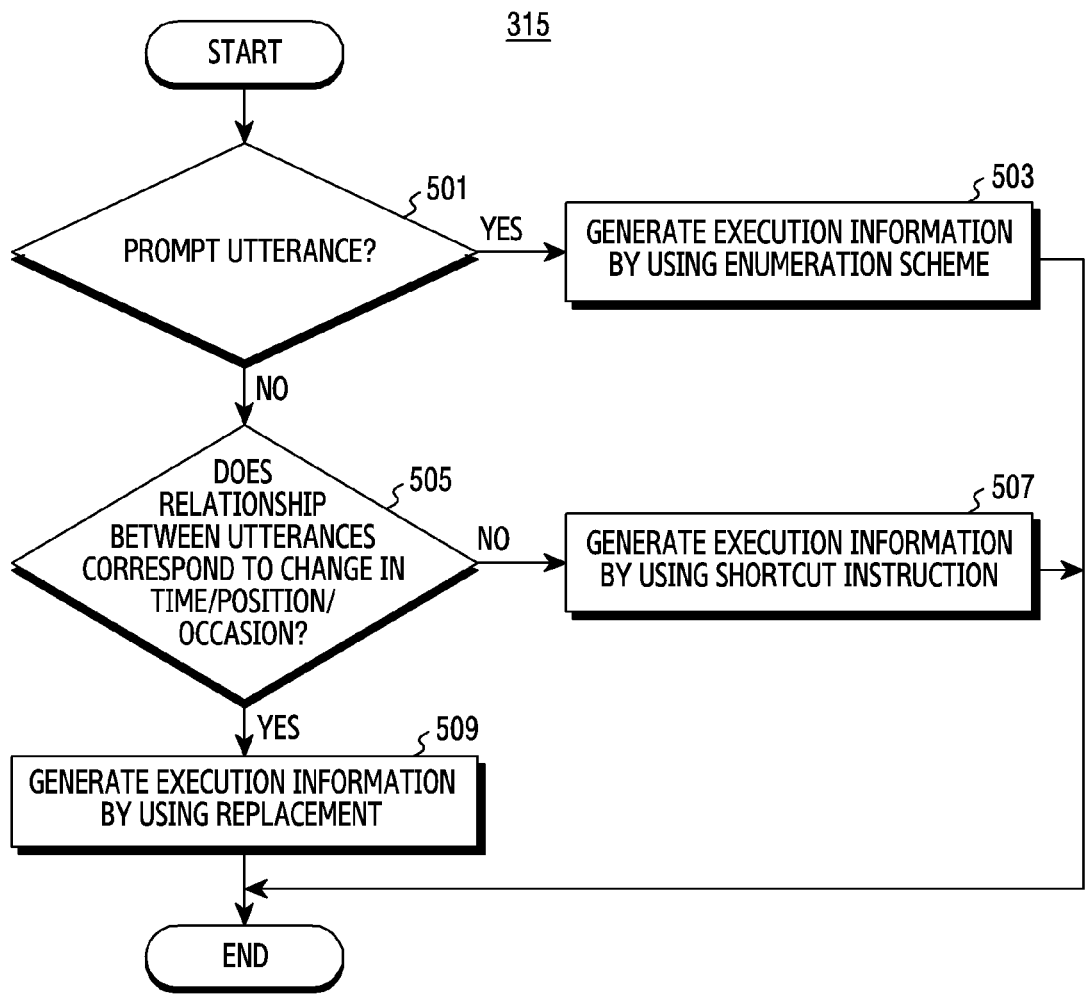
FIG. 5 is a flowchart illustrating a method of generating execution information of an electronic device according to an embodiment of the disclosure.

FIG. 5 is a flowchart illustrating a method of generating execution information of an electronic device according to an embodiment of the disclosure.

Referring to FIG. 5, in operation 501, a processor (e.g., the processor 120 of FIG. 1, the processing module 235 of FIG. 2) of an electronic device (e.g., the electronic device 101 of FIG. 1) according to an embodiment of the disclosure may identify whether an utterance requested to be shared is a prompt utterance.

If the identification result of operation 501 shows that the utterance requested to be shared is the prompt utterance, in operation 503, the processor 120 may generate execution information by using an enumeration scheme. For example, the processor 120 may generate a second instruction in the form of a sentence by enumerating instructions corresponding to respective utterances, and may generate execution information including the second instruction. Details thereof will be described below with reference to FIG. 6A and FIG. 6B.

If the identification result of operation 501 shows that the utterance requested to be shared is not the prompt utterance, in operation 505, the processor 120 may identify whether a relationship between the utterances corresponds to a change in time, place, or occasion. According to some embodiments, the processor 120 may identify whether a parameter having the same attribute as the utterance requested to be shared is included in a previous utterance.

If the identification result of operation 505 shows that the relationship of each utterance does not correspond to the change in time, position, or occasion, in operation 507, the processor 120 may generate execution information by using a shortcut instruction. For example, the processor 120 may generate a shortcut instruction to execute instructions corresponding to respective utterances upon receiving an utterance corresponding to the shortcut instruction, and may generate execution information including the shortcut instruction. A name of the shortcut instruction may be a name of a domain which executes the utterance requested to be shared. Details thereof will be described below with reference to FIG. 7.

If the identification result of operation 505 shows that the relationship between the utterances corresponds to the change in time, position, or occasion, in operation 509, the processor 120 may generate execution information by using replacement. For example, the processor 120 may generate a second instruction by replacing a part (e.g., a word) of an instruction corresponding to a root utterance (an initial utterance) with an utterance requested to be shared (a follow-up utterance), and may generate execution information including the second instruction. Details thereof will be described below with reference to FIG. 8A and FIG. 8B.

Figure 6A:
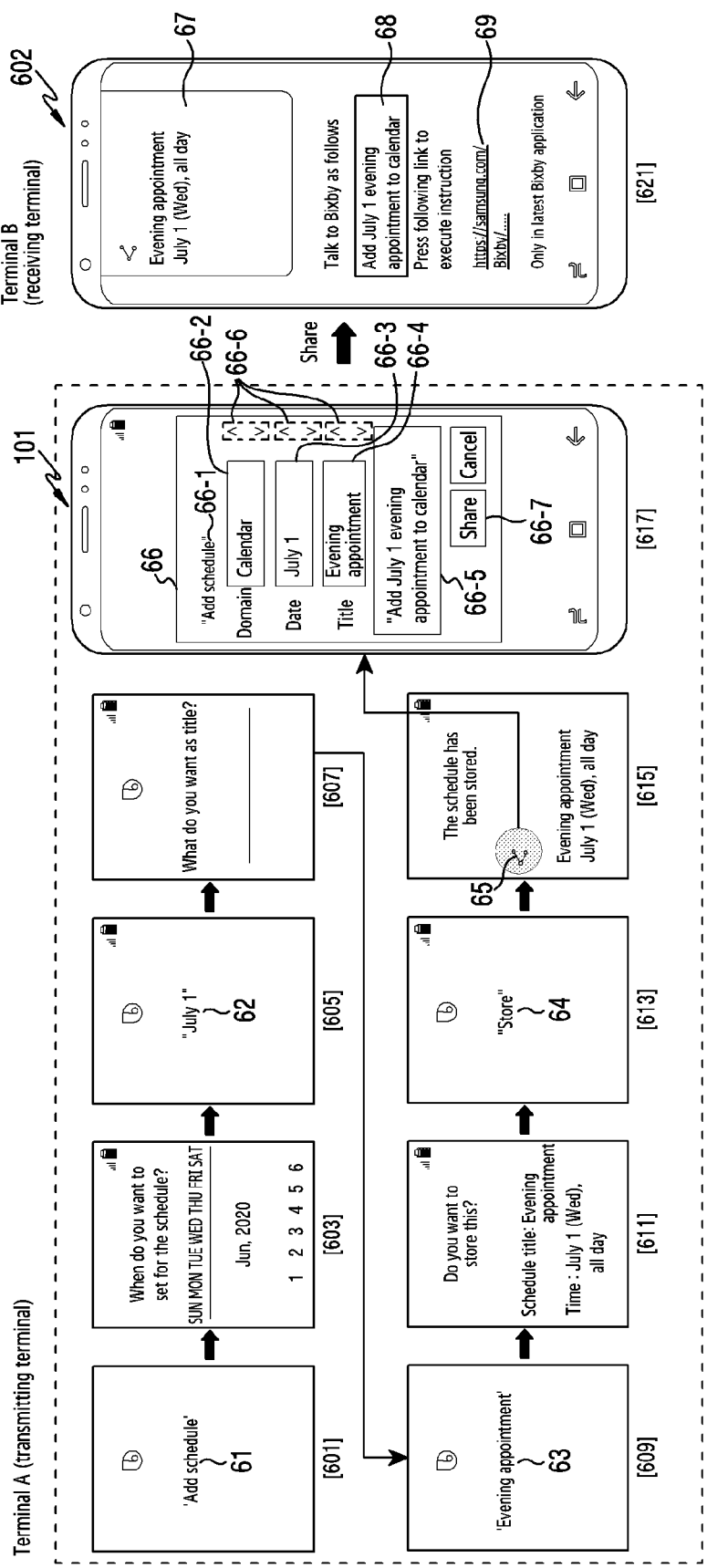
FIG. 6A is a diagram illustrating an example of generating execution information on a prompt utterance by using an enumerating scheme of an electronic device according to an embodiment of the disclosure.

FIG. 6A is a diagram illustrating an example of generating execution information on a prompt utterance by using an enumerating scheme of an electronic device according to an embodiment of the disclosure.

Figure 6B:
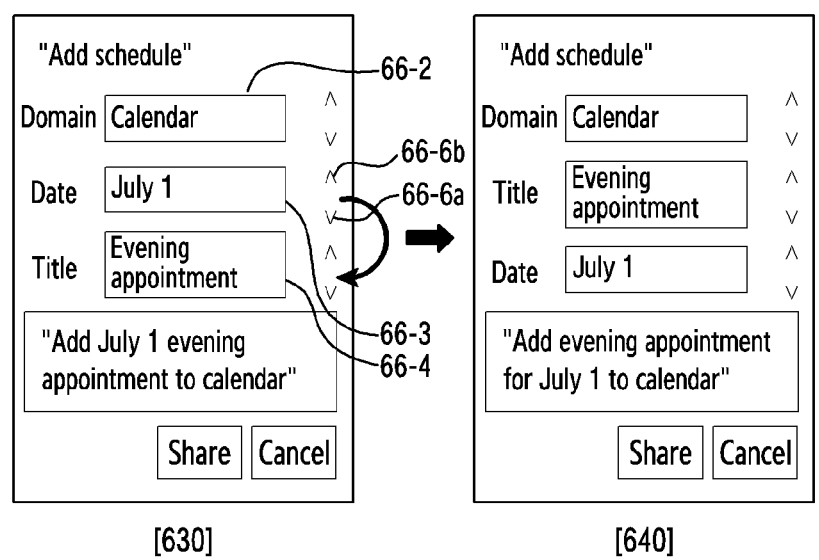
FIG. 6B is a diagram illustrating an example of editing execution information on a prompt utterance of an electronic device according to an embodiment of the disclosure.

FIG. 6B is a diagram illustrating an example of editing execution information on a prompt utterance of an electronic device according to an embodiment of the disclosure.

Referring to FIGS. 6A and 6B, upon receiving a user's utterance (hereinafter, a first utterance), the electronic device 101 (e.g., the processor 120 of FIG. 1, the processing module 235 of FIG. 2) according to an embodiment of the disclosure may convert the received first utterance into a text and provide the converted text through a display (e.g., the display module 160). For example, as shown in a drawing indicated by a reference numeral 601, if a speech recognition assistant application is activated (executed) and then a user's first utterance (e.g., "add a schedule") which requests to add a schedule is received through a microphone, the electronic device 101 may convert the received first utterance into a text 61 and output the converted text 61 on one side of the display. Through the text 61 output on the display, a user may identify whether the electronic device 101 recognizes the first utterance without error.

According to an embodiment, if the first utterance is analyzed to be determined as a prompt utterance requiring additional information, the electronic device 101 may request to input the additional information on the first utterance (hereinafter, first additional information). For example, as shown in a drawing indicated by a reference numeral 603, if the first utterance is determined as a prompt utterance requiring an additional input of a date and a title, the electronic device 101 may output a screen which requests to input the first additional information (e.g., a date for storing a schedule) on a display and/or output an audio signal which inquires whether to store a schedule through a speaker (e.g., the sound output module 155 of FIG. 1).

According to an embodiment, as shown in a drawing indicated by a reference numeral 605, in response to reception of a second utterance (e.g., "July 1") corresponding to a date for storing a schedule, the electronic device 101 may output on the display a text 62 corresponding to the second utterance.

According to an embodiment, upon completion of the inputting of the first additional information, the electronic device 101 may request to input second additional information on the first utterance. For example, as shown in a drawing indicated by a reference numeral 607, the electronic device 101 may output on the display a screen which requests to input the second additional information (e.g., a title of the schedule) and/or output an audio signal which inquires whether to store the schedule through the speaker.

According to an embodiment, as shown in a drawing indicated by a reference numeral 609, in response to a third utterance (e.g., "evening appointment") corresponding to the title of the schedule, the electronic device 101 may output on the display a text 63 corresponding to the third utterance.

According to an embodiment, upon completion of inputting of all additional information required to process the first utterance, as shown in a drawing indicated by a reference numeral 611, the electronic device 101 may output on the display a screen which inquires whether to store a schedule determined through the first to third utterances and/or output an audio signal which inquires whether to store the schedule through the speaker.

According to an embodiment, as shown in a drawing indicated by a reference numeral 613, in response to reception of a fourth utterance (e.g., "store") which requests to store a schedule, the electronic device 101 may output a text 64 corresponding to the fourth utterance on one side of the display.

According to an embodiment, as shown in a drawing indicated by a reference numeral 615, the electronic device 101 may output a result screen (e.g., an execution result screen) on the display to notify that the storing of the schedule is complete. The execution result screen may include a first sharing menu 65.

According to an embodiment, as shown in drawings indicated by reference numerals 615 and 617, when the first sharing menu 65 is selected (e.g., touched), the electronic device 101 may output a popup window 66 on the display to generate an instruction (e.g., a second instruction) to be included in execution information (e.g., second execution information). For example, in response to a request to share a third utterance, the electronic device 101 may analyze a relationship between the third utterance requested to be shared and previous utterances (the first utterance and the second utterance) (e.g., analyze a type of the third utterance according to the flowchart of FIG. 4), and may display the popup window 66 on the display if the third utterance has continuity with the previous utterances but the third utterance is identified as additional information on the first utterance (e.g., determined as a prompt utterance).

According to an embodiment, the popup window 66 may include a text 66-1 corresponding to the first utterance, a first field 66-2 indicating application information (e.g., domain information) for processing the first utterance, a second field 66-3 indicating first additional information, a third field 66-4 indicating second additional information, and a fourth field (or referred to as an instruction field) 66-5 indicating an instruction generated based on information on the accumulated utterance. The instruction may be generated based on the third utterance (e.g., evening appointment) requested to be shared, previous utterances (e.g., the first utterance (add a schedule) and the second utterance (July 1)), and application information. For example, as shown in a drawing indicated by a reference numeral 617, the electronic device 101 may generate an instruction (e.g., "Add a July 1 evening appointment to the calendar") by enumerating texts corresponding to the accumulated utterances (e.g., the first to third utterances) and application information according to a specified rule. For example, the electronic device 101 may generate an instruction by enumerating texts corresponding to the accumulated utterance and application information according to an order of obtaining the utterances. As another example, the electronic device 101 may generate an instruction by enumerating the texts corresponding to the accumulated utterances and application information according to the 5W1H principle.

According to some embodiments, the electronic device 101 may generate an instruction by enumerating the texts corresponding to the accumulated utterances (e.g., the first to third utterances) according to a specified rule. As such, when the instruction is generated using the texts corresponding to the accumulated utterances, the electronic device may execute the instruction by using an application specified by default according to an attribute of the instruction.

According to some embodiments, the electronic device 101 may change the order of the first field 66-2 to the third field 66-4. For example, as shown in FIG. 6B, the electronic device 101 may change the order of the second field 66-3 and the third field 66-4 in response to selection of a down arrow 66-6a included in a change menu 66-6 located to the right of the second field 66-3. As another example, the electronic device 101 may change the order of the second field 66-3 and the first field 66-2 in response to selection of an up arrow 66-6b included in the change menu 66-6 located to the right of the second field 66-3. When the order of the first field 66-2 to the third field 66-4 is changed, the electronic device 101 may generate again an instruction, based on the changed order. For example, when the order of the second field 66-3 and the third field 66-4 is changed, as shown in a drawing indicated by reference numerals 630 and 640 of FIG. 6B, the electronic device 101 may change an instruction from "Add a July 1 evening appointment to the calendar" to "Add an evening appointment for July 1 to the calendar".

According to some embodiments, a user may edit a text by selecting (touching) one of the first field 66-2 to the third field 66-4. When the text is modified in at least one of the first field 66-2 to the third field 66-4, the electronic device 101 may modify (update) an instruction of the fourth field 66-5, based on the modified text. According to another example, the user may directly edit the instruction by selecting (touching) the fourth field 66-5.

According to an embodiment, as shown in a drawing indicated by a reference numeral 617, the electronic device 101 may generate execution information, based on an instruction (e.g., "Add a July 1 evening appoint to the calendar") generated when a second sharing menu 66-7 is selected, and may transmit the generated execution information to a different electronic device 602 (e.g., the electronic device 102 or electronic device 104 of FIG. 1). The execution information may include an execution result screen, an instruction, and link information. For example, the electronic device 101 may generate execution information by capturing the execution result screen, extracting a generated instruction, and generating a link capable of executing the instruction.

According to an embodiment, as shown in a drawing indicated by a reference numeral 621, the different electronic device 602 which has received the execution information from the electronic device 101 may output on the display a capture image 67, an instruction 68, and link information 69 corresponding to the execution result screen. According to an embodiment, upon detecting the selection (e.g., touch) of the link information 69, the different electronic device 602 may execute the instruction 68 through a speech recognition assistant application, and may output on the display the execution result screen corresponding (e.g., identical) to the capture image 67 or the drawing indicated by the reference numeral 615.

It is shown in FIG. 6A that the electronic device 101 transmits the execution information to the different electronic device 602 by using a text message. However, the electronic device 101 may transmit the execution information to the different electronic device 602 by using various means (e.g., an instant message, an e-mail, or short-range wireless communication (e.g., Bluetooth, WiFi-direct)).

Although not shown in FIG. 6A, the electronic device 101 may output on the display a screen capable of selecting at least one different electronic device for transmitting (sharing) execution information when the second sharing menu 66-7 is selected.

Figure 7:
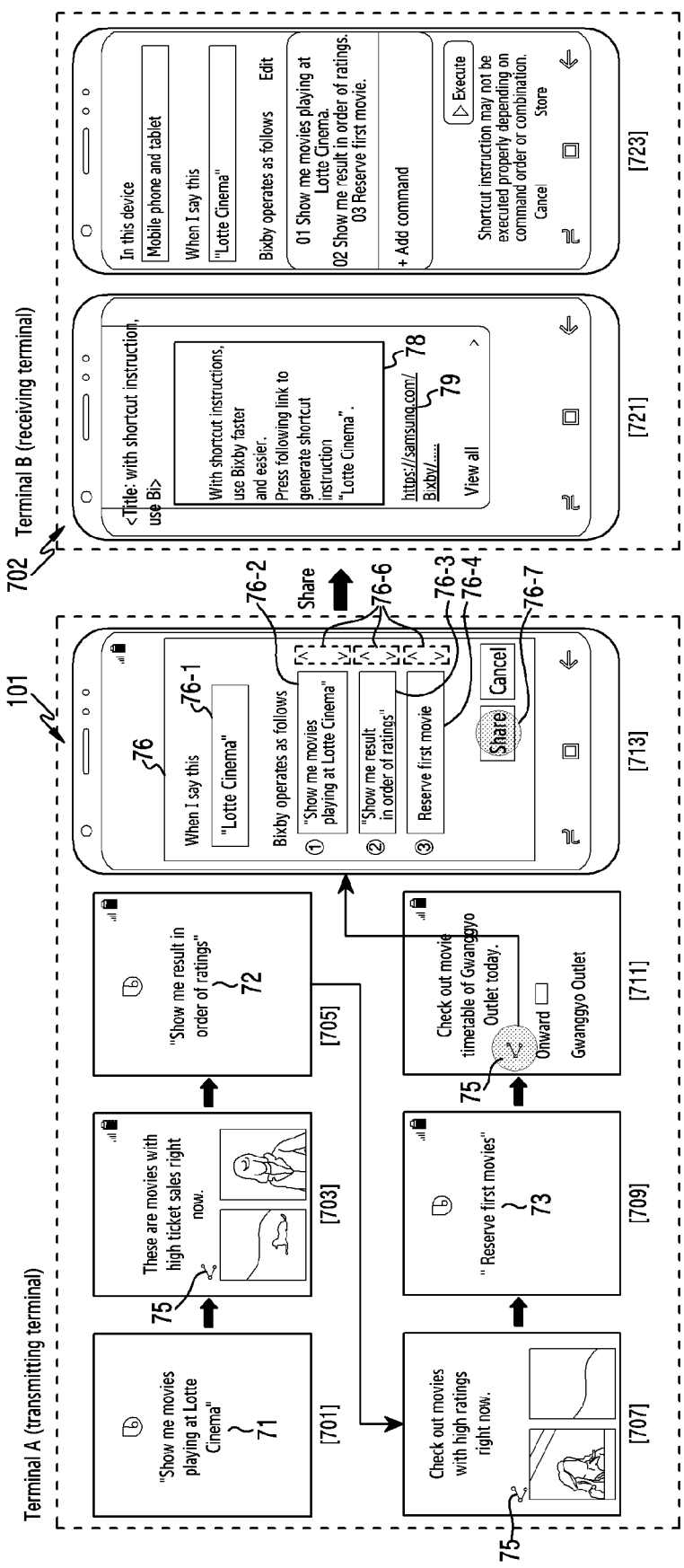
FIG. 7 is a diagram illustrating an example of generating execution information on a follow-up utterance by using a shortcut instruction of an electronic device according to an embodiment of the disclosure.

FIG. 7 is a diagram illustrating an example of generating execution information on a follow-up utterance by using a shortcut instruction of an electronic device according to an embodiment of the disclosure.

Referring to FIG. 7, upon receiving a user's utterance (hereinafter, a first utterance), the electronic device 101 (e.g., the processor 120 of FIG. 1, the processing module 235 of FIG. 2) according to an embodiment of the disclosure may provide a text corresponding to the received first utterance through a display (e.g., the display module 160). For example, as shown in a drawing indicated by a reference numeral 701, upon receiving the user's first utterance (e.g., "Show me movies playing at Lotte Cinema") which requests to search movies through a microphone after a speech recognition assistant application is activated, the electronic device 101 may convert the received first utterance into a text 71 and output the converted text 71 on a display. Through the text 71 output on the display, the user may identify whether the electronic device 101 recognizes the first utterance without error.

According to an embodiment, the electronic device 101 may analyze the first utterance and perform a corresponding function (action). For example, in response to reception of the first utterance, as shown in a drawing indicated by a reference numeral 703, the electronic device 101 may search movies playing at Lotte Cinema and output a search result (e.g., an execution result screen) on the display. For example, the electronic device 101 may output the search result (e.g., the execution result screen) by sorting the movies in the descending order of ticket sales in Lotte Cinema.

The execution result screen may include a first sharing menu 75.

According to an embodiment, the electronic device 101 may receive a user's utterance (hereinafter, a second utterance). For example, the electronic device 101 may receive the second utterance (e.g., "Show me the result in order of ratings") which requests to re-sort search results. In response to reception of the second utterance, as shown in a drawing indicated by a reference numeral 705, the electronic device 101 may convert the received second utterance into a text 72 and output the converted text 72 on the display.

According to an embodiment, the electronic device 101 may analyze the second utterance and preform a corresponding function (action). For example, as shown in a drawing indicated by a reference numeral 707, the electronic device 101 may output on the display the search results re-sorted in the order of ratings.

The re-sorted search result screen may include the first sharing menu 75.

According to an embodiment, the electronic device 101 may receive a user's utterance (hereinafter, a third utterance). For example, the electronic device 101 may receive the third utterance (e.g., "Reserve the first movie.") which requests to reserve a movie. In response to reception of the third utterance, as shown in a drawing indicated by a reference numeral 709, the electronic device 101 may convert the received third utterance into a text 73 and output the converted text 73 on the display.

According to an embodiment, the electronic device 101 may analyze the third utterance and perform a corresponding function (action). For example, as shown in a drawing indicated by a reference numeral 711, the electronic device 101 may recognize that the third utterance is a request to reserve a movie, and may output on the display a screen (e.g., a movie timetable) which requests for additional information to reserve the movie.

According to an embodiment, when the first sharing menu 75 is selected (e.g., touched), the electronic device 101 may output a popup window 76 on the display to generate a shortcut instruction (e.g., a second instruction). For example, in response to the request to share the third utterance, the electronic device 101 may analyze a relationship between the third utterance requested to be shared and previous utterances (the first utterance and the second utterance) (e.g., analyze a type of the third utterance according to the flowchart of FIG. 4), and may display the popup window 76 on the display to generate a shortcut instruction if it is identified (or determined) that an action to be performed is different from that of the previous utterance although the third utterance is a follow-up utterance of the previous utterances. For example, although the third utterance is the follow-up utterance executed in the same domain (e.g., a Lotte Cinema application) as the previous utterances, if it is identified that an action of the first utterance (e.g., searching playing movies), an action of the second utterance (e.g., re-storing search results), and an action of the third utterance (e.g., searching for a screening time of a movie requested to be reserved) are different, the electronic device 101 may output the popup window 76 on the display to generate a shortcut instruction.

According to an embodiment, the popup window 76 may include a first field 76-1 indicating a shortcut instruction, a second field 76-2 indicating an instruction corresponding to the first utterance, a third field 76-3 indicating an instruction corresponding to the second utterance, and a fourth field 76-4 indicating an instruction corresponding to the third utterance. The popup window 76 may include a second sharing menu 76-6 and an order change menu 76-6 capable of changing orders of the second field 76-2 to the fourth field 76-4. According to some embodiments, a user may edit a name of the shortcut instruction by selecting the first field 76-1. As another example, the user of the electronic device 101 may edit the instruction by selecting (touching) at least one of the second field 76-2 to the fourth field 76-4.

According to an embodiment, as shown in a drawing indicated by a reference numeral 713, the electronic device 101 may generate execution information (e.g., second execution information), based on the shortcut instruction of the popup window 76, when the second sharing menu 76-7 is selected, and may transmit the generated execution information to a different electronic device 702 (e.g., the electronic device 102 or electronic device 104 of FIG. 1).

According to an embodiment, as shown in a drawing indicated by a reference numeral 721, the different electronic device 702 which has received the execution information from the electronic device 101 may output on the display a shortcut instruction 78 and link information 79. Although a capture image corresponding to an execution result screen is not shown in the drawing indicated by the reference numeral 721 of FIG. 7, the different electronic device 702 may display the capture image corresponding to the execution result screen together with the shortcut instruction 78 and the link information 79, similarly to the drawing indicated by the reference numeral 621 of FIG. 6.

According to an embodiment, upon detecting the selection (e.g., touch) of the link information 79, the different electronic device 702 may perform a corresponding function. For example, upon detecting the selection (e.g., touch) of the link information 79, as shown in a drawing indicated by a reference numeral 723, the different electronic device 702 may output on the display a screen (e.g., an editing screen) capable of editing and storing the shortcut instruction 78. According to some embodiments, upon detecting the selection (e.g., touch) of the link information 79, the different electronic device 702 may execute the shortcut instruction 78 through a speech recognition assistant application, and may output on the display an execution result screen corresponding (e.g., identical) to a capture image or the drawing indicated by the reference numeral 711.

Figure 8A:
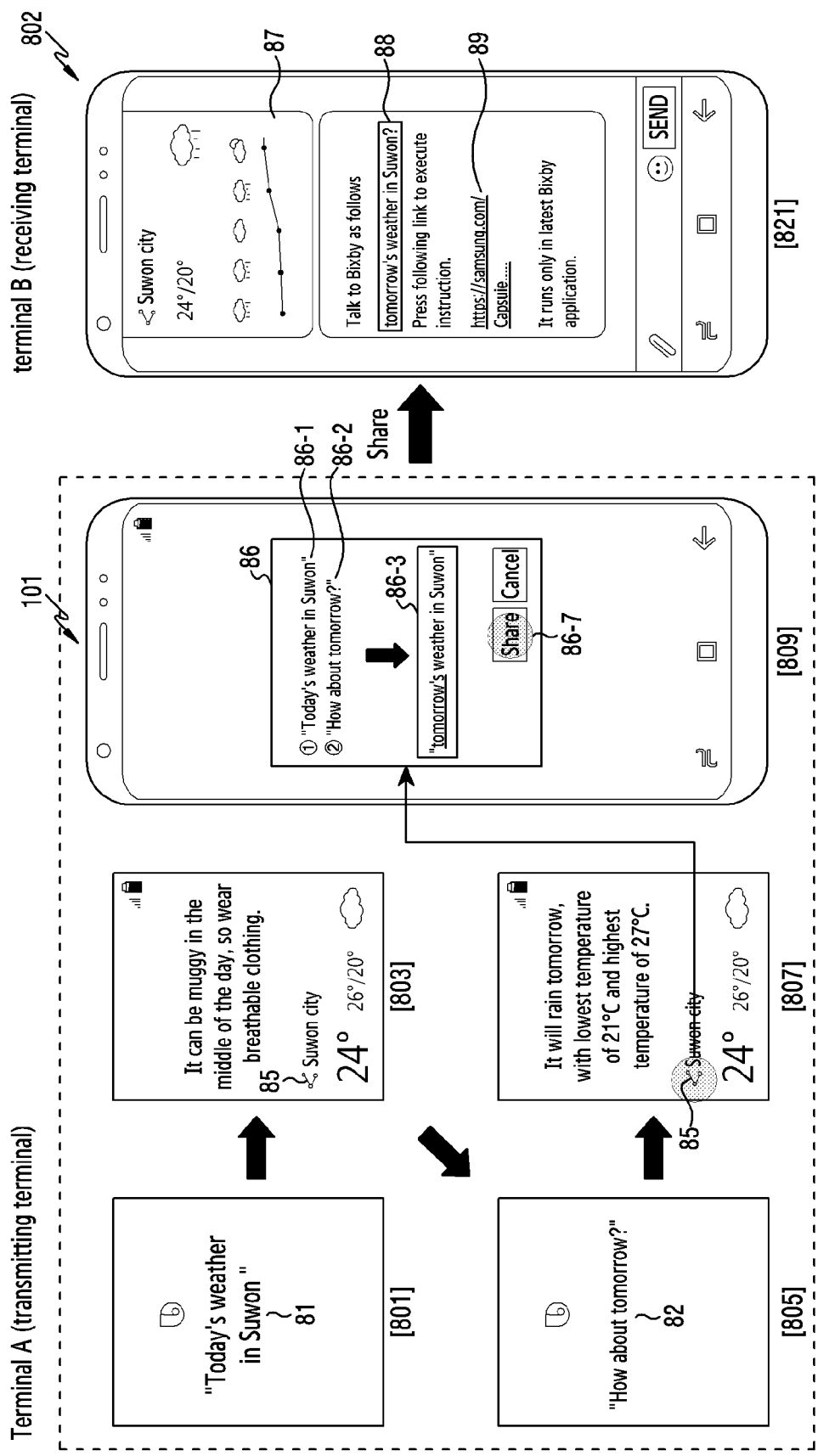
FIG. 8A illustrates an example of generating execution information on a follow-up utterance by using a replacement of an electronic device according to an embodiment of the disclosure.

FIG. 8A illustrates an example of generating execution information on a follow-up utterance by using a replacement of an electronic device according to an embodiment of the disclosure.

Figure 8B:
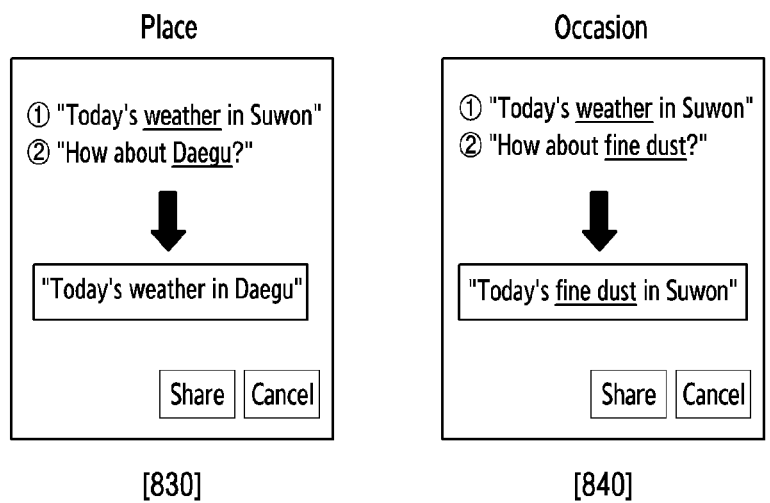
FIG. 8B is a diagram illustrating another example of generating execution information on a follow-up utterance by using a replacement of an electronic device according to an embodiment of the disclosure.

FIG. 8B is a diagram illustrating another example of generating execution information on a follow-up utterance by using a replacement of an electronic device according to an embodiment of the disclosure.

Referring to FIGS. 8A and 8B, upon receiving a user's utterance (hereinafter, a first utterance), the electronic device 101 (e.g., the processor 120 of FIG. 1, the processing module 235 of FIG. 2) according to an embodiment of the disclosure may provide a text corresponding to the received first utterance through a display (e.g., the display module 160). For example, as shown in a drawing indicated by a reference numeral 801, upon receiving a first utterance (e.g., "Today's weather in Suwon") which requests for weather information through a microphone after a speech recognition assistant application is activated, the electronic device 101 may convert the received first utterance into a text 81 and output the converted text 81 on a display. Through the text 81 output on the display, the user may identify whether the electronic device 101 recognizes the first utterance without error.

According to an embodiment, the electronic device 101 may analyze the first utterance and perform a corresponding function (action). For example, in response to reception of the first utterance, as shown in a drawing indicated by a reference numeral 803, the electronic device 101 may search for today's weather in Suwon and output a search result (e.g., an execution result screen) on the display. The execution result screen may include a first sharing menu 85

According to an embodiment, the electronic device 101 may receive a user's utterance (hereinafter, a second utterance). For example, as shown in a drawing indicated by a reference numeral 805, the electronic device 101 may receive the second utterance (e.g., "How about tomorrow?") which requests for tomorrow's weather. In response to reception of the second utterance, the electronic device 101 may convert the second utterance into a text 82 and output the converted text 82 through the display.

According to an embodiment, the electronic device 101 may analyze the second utterance and preform a corresponding function (action). For example, in response to reception of the second utterance, as shown in a drawing indicated by a reference numeral 807, the electronic device 101 may search for tomorrow's weather in Suwon and output a search result on the display.

According to an embodiment, as shown in drawings indicated by reference numerals 807 and 809, when the first sharing menu 85 is selected (e.g., touched), the electronic device 101 may output a popup window 86 on the display to generate an instruction (e.g., a second instruction) related to the second utterance requested to be shared. For example, in response to a request to share the second utterance, the electronic device 101 may analyze a relationship between the second utterance requested to be shared and a previous utterance (the first utterance) (e.g., analyze a type of the second utterance according to the flowchart of FIG. 4), and may display the popup window 86 for generating an instruction through a replacement on the display if the second utterance is a follow-up utterance of the previous utterance and if it is identified (or determined) that an action to be performed is identical to that of the previous utterance (e.g., a goal ID is identical to that of the previous utterance). For example, the electronic device 101 may output on the display the popup window 86 for generating an instruction through a replacement if the second utterance is a follow-up utterance executed in the same domain (e.g., a weather application) as the previous utterance and if it is identified that an action of the first utterance (e.g., searching for weather) is identical to an action of the second utterance (e.g., searching for weather).

According to an embodiment, the popup window 86 may include a text 86-1 corresponding to the first utterance, a text 86-2 corresponding to the second utterance, and an instruction field 86-3 indicating an instruction generated based on the first utterance and the second utterance. The instruction may be generated by replacing an element (e.g., a word) having the same attribute as the second utterance with the text corresponding to the second utterance in the texts corresponding to the first utterance. For example, as shown in a drawing indicated by a reference numeral 809 of FIG. 8A, the processor 120 may identify that the second utterance "How about tomorrow?" has a time attribute, and may generate an instruction such as "tomorrow's weather in Suwon" by replacing "today" having the time attribute in "today's weather in Suwon" of the first utterance with "tomorrow" of the second utterance. As another example, as shown in a drawing indicted by a reference numeral 830 of FIG. 8B, if it is identified that the second utterance "How about Daegu?" has a place attribute, the processor 120 may generate an instruction such as "today's weather in Daegu" by replacing "Suwon" having the place attribute in a text "today's weather in Suwon" corresponding to the first utterance with "Daegu" of the second utterance. As another example, as shown in a drawing indicated by a reference numeral 840 of FIG. 8B, if it is identified that the second utterance "How about fine dust?" has an occasion attribute, the processor 120 may generate an instruction such as "today's fine dust in Suwon" by replacing "weather" having the occasion attribute in a text "today's weather in Suwon" corresponding to the first utterance with "fine dust" of the second utterance.

According to some embodiments, a user may edit an instruction generated by selecting (touching) the instruction field 86-3.

According to an embodiment, upon detecting the selection of the second sharing menu 86-7 of the popup window 86, the electronic device 101 may generate execution information (e.g., second execution information), based on an instruction included in the instruction field 86-3, and may transmit the generated execution information to a different electronic device 802 (e.g., the electronic device 102 or electronic device 104 of FIG. 1).

According to an embodiment, as shown in a drawing indicated by a reference numeral 821, the different electronic device 802 which has received the execution information from the electronic device 101 may output on the display a capture image 87, an instruction 88, and link information 89 corresponding to an execution result screen included in the received execution information. According to an embodiment, upon detecting the selection (e.g., touch) of the link information 89, the different electronic device 802 may execute the instruction 88 through a speech recognition assistant application, and may output on the display the execution result screen corresponding (e.g., identical) to the capture image 87 or the drawing indicated by the reference numeral 807.

Meanwhile, various embodiments of the disclosure have been described above by taking an example of receiving an utterance and then sharing an execution result corresponding to the utterance. According to an embodiment, various embodiments of the disclosure may also be applied when a shortcut instruction is generated. For example, when a shortcut instruction for executing a plurality of instructions (hereinafter, a main shortcut instruction) is generated, the user may select one of previously stored utterances so that an instruction or shortcut instruction (hereinafter, a sub shortcut instruction) corresponding to the selected utterance is included (or registered) in the main shortcut instruction. The electronic device 101 (e.g., the processor 120) may analyze the selected utterance, and if the selected utterance is a continuous utterance which requires information on a previous utterance, may generate an instruction or sub shortcut instruction, based on an accumulated utterance (the selected utterance and the previous utterance), so that it is included in the main shortcut instruction as described above.

Figure 9:
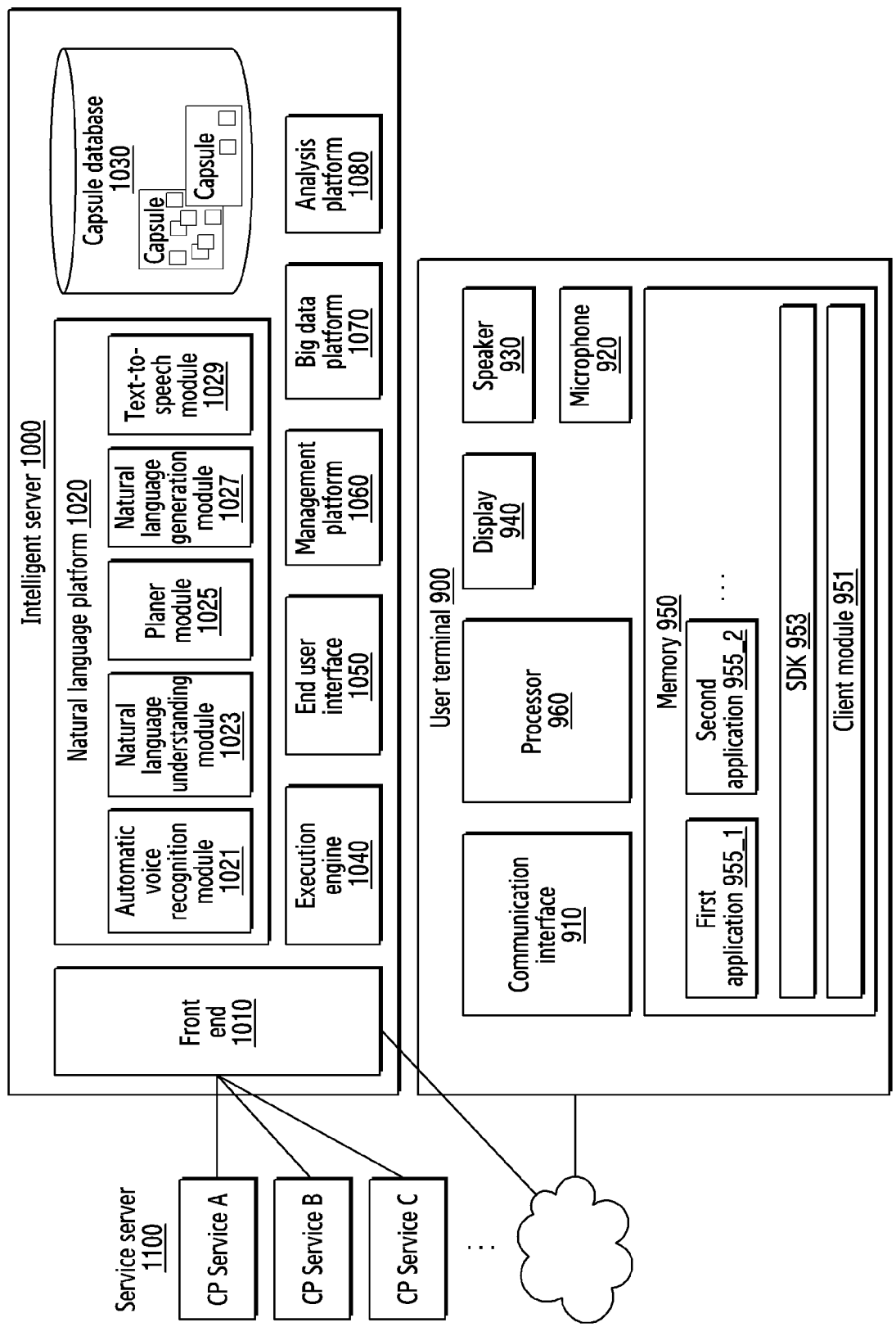
FIG. 9 is a block diagram illustrating an integrated intelligence system according to an embodiment of the disclosure.

FIG. 9 is a block diagram illustrating an integrated intelligence system according to an embodiment of the disclosure.

Referring to FIG. 9, the integrated intelligence system of an embodiment may include a user terminal 900 (e.g., the electronic device 101 of FIG. 1), an intelligent server 1000 (e.g., the server 108 of FIG. 1), and a service server 1100.

The user terminal 900 of an embodiment may be a terminal device (or an electronic device) connectable to the Internet, and may be, for example, a mobile phone, a smart phone, a Personal Digital Assistant (PDA), a notebook computer, a TV, white goods, a wearable device, a head-mounted display (HMD), or smart speaker.

According to the illustrated embodiment, the user terminal 900 may include a communication interface 910 (e.g., the communication module 190 of FIG. 1), a microphone 920 (e.g., the input module 150 of FIG. 1), a speaker 930 (e.g., the sound output module 155 of FIG. 1), a display 940 (e.g., the display module 160 of FIG. 1), a memory 950 (e.g., the memory 130 of FIG. 1), or a processor 960 (e.g., the processor 120 of FIG. 1). The enumerated components may be operatively or electrically coupled to each other.

The communication interface 910 of an embodiment may be configured to be coupled with an external device to transmit/receive data. The microphone 920 of an embodiment may receive a sound (e.g., a user's utterance) and convert it into an electrical signal. The speaker 930 of an embodiment may output the electrical signal as a sound (e.g., a voice). The display 940 of an embodiment may be configured to display an image or a video. The display 940 of an embodiment may also display a Graphic User Interface (GUI) of an app (or an application program) to be executed.

The memory 950 of an embodiment may store a client module 951, a Software Development Kit (SDK) 953, and a plurality of apps 955_1 and 955_2. The client module 951 and the SDK 953 may configure a framework (or a solution program) for performing a general-purpose function. In addition, the client module 951 or the SDK 953 may configure a framework for processing a voice input.

The plurality of apps 955_1 and 955_2 stored in the memory 950 of an embodiment may be a program for performing a specified function. According to an embodiment, the plurality of apps 955_1 and 955_2 may include the first app 955_1 and the second app 955_2. According to an embodiment, the plurality of apps 955_1 and 955_2 may respectively include a plurality of actions for performing a specified function. For example, the apps may include an alarm app, a message app, and/or a schedule app. According to an embodiment, the plurality of apps 955_1 and 955_2 may be executed by the processor 960 to sequentially execute at least part of the plurality of actions.

The processor 960 of an embodiment may provide overall control to the user terminal 900. For example, the processor 960 may be electrically coupled with the communication interface 910, the microphone 920, the speaker 930, and the display 940 to perform a specified action.

The processor 960 of an embodiment may also perform a specified function by executing a program stored in the memory 950. For example, the processor 960 may execute at least one of the client module 951 and the SDK 953 to perform the following action for processing a voice input.

The processor 960 may control an action of the plurality of apps 955_1 and 955_2, for example, through the SDK 953. The following action described as the action of the client module 951 or SDK 953 may be an action based on the execution of the processor 960.

The client module 951 of an embodiment may receive a voice input. For example, the client module 951 may receive a voice signal corresponding to a user utterance detected through the microphone 920. The client module 951 may transmit the received voice input to the intelligent server 1000. The client module 951 may transmit state information of the user terminal 900 to the intelligent server 1000, together with the received voice input. The state information may be, for example, execution state information of an app.

The client module 951 of an embodiment may receive a result corresponding to the received voice input. For example, if the intelligent server 1000 is capable of producing the result corresponding to the received voice input, the client module 951 may receive the result corresponding to the received voice input. The client module 951 may display the received result on the display 940.

The client module 951 of an embodiment may receive a plan corresponding to the received voice input. According to the plan, the client module 951 may display on the display 940 a result obtained by executing a plurality of actions of an app. For example, the client module 951 may display on the display the result obtained by executing the plurality of actions sequentially. As another example, the user terminal 900 may display on the display only some results obtained by executing the plurality of actions (e.g., a result of the last action).

According to an embodiment, the client module 951 may receive from the intelligent server 1000 a result for obtaining necessary information for producing the result corresponding to the voice input. According to an embodiment, the client module 951 may transmit the necessary information to the intelligent server 1000 in response to the request.

The client module 951 of an embodiment may transmit, to the intelligent server 1000, information on a result obtained by executing the plurality of actions according to the plan. The intelligent server 1000 may use the result information to identify that the received voice input is properly processed.

The client module 951 of an embodiment may include a speech recognition module. According to an embodiment, the client module 951 may recognize a voice input which performs a limited function through the speech recognition module. For example, the client module 951 may perform an intelligent app for processing a voice input which performs an action organically through a specified input (e.g., Wake up!).

The intelligent server 1000 of an embodiment may receive information related to a user voice input from the user terminal 900 through a communication network. According to an embodiment, the intelligent server 1000 may change data related to the received voice input into text data. According to an embodiment, the intelligent server 1000 may generate a plan for performing a task corresponding to the user voice input, based on the text data.

According to an embodiment, the plan may be generated by an Artificial Intelligent (AI) system. The AI system may be a rule-based system, or may be a neural network-based system (e.g., a Feedforward Neural Network (FNN), a Recurrent Neural Network (RNN)). Alternatively, the AI system may be a combination of the aforementioned systems or may be another AI system. According to an embodiment, the plan may be selected from a set of predefined plans, or may be generated on a real-time basis in response to a user request. For example, the AI system may select at least one plan from among a plurality of predefined plans.

The intelligent server 1000 of an embodiment may transmit a result depending on the generated plan to the user terminal 900, or may transmit the generated plan to the user terminal 900. According to an embodiment, the user terminal 900 may display on the display the result depending on the plan. According to an embodiment, the user terminal 900 may display on the display the result obtained by executing an action depending on the plan.

The intelligent server 1000 of an embodiment may include a front end 1010, a natural language platform 1020, a capsule DB (or a domain DB) 1030, an execution engine 1040, an end user interface 1050, a management platform 1060, a big data platform 1070, or an analytic platform 1080.

The front end 1010 of an embodiment may receive a voice input received from the user terminal 900. The front end 1010 may transmit a response corresponding to the voice input.

According to an embodiment, the natural language platform 1020 may include an Automatic Speech recognition (ASR) module 1021, a Natural Language Understanding (NLU) module 1023, a planner module 1025, a Natural Language Generator (NLG) module 1027, or a Text To Speech (TTS) module 1029.

The ASR module 1021 may convert a voice input received from the user terminal 900 into text data. The NLU module 1023 may use the text data of the voice input to recognize a user's intent. For example, the NLU 1023 may perform syntactic analysis or semantic analysis to recognize the user's intent. The NLU 1023 of an embodiment may recognize a meaning of a word extracted from the voice input by using a linguistic feature (e.g., a grammatical element) of a morpheme or phrase, and may determine a user's intent by matching the recognized meaning of the word with the intent.

The planner module 1025 may generate a plan by using a parameter and the intent determined in the NLU module 1023. According to an embodiment, the planner module 1025 may determine a plurality of domains necessary to perform a task, based on the determined intent. The planner module 1025 may determine a plurality of actions respectively included in the plurality of domains determined based on the intent. According to an embodiment, the planner module 1025 may determine a parameter necessary to execute the determined plurality of actions or a result value output by the execution of the plurality of actions. The parameter and the result value may be defined with the concept of a specified form (or class). Accordingly, the plan may include the plurality of actions determined by the user's intent and a plurality of concepts. The planner module 1025 may determine a relationship between the plurality of actions and the plurality of concepts step by step (or hierarchically). For example, the planner module 1025 may determine an execution order of the plurality of actions determined based on the user's intent. In other words, the planner module 1025 may determine the execution order of the plurality of actions, based on a parameter necessary to execute the plurality of actions and a result output by the execution of the plurality of actions. Accordingly, the planner module 1025 may generate a plan including association information (e.g., ontology) between the plurality of actions and the plurality of concepts. The planner module 1025 may generate the plan by using information stored in the capsule DB 1030 which stores a set of relationships of the concept and the action.

The NLG module 1027 of an embodiment may change specified information to a text form. The information changed to the text form may be in the form of a natural language utterance. The TTS module 1029 of an embodiment may change the information in the text form to information in a voice form.

According to an embodiment, all or some of the functions of the natural language platform 1020 may also be implemented in the user terminal 900.

The capsule DB 1030 may store information on a relationship of a plurality of concepts and actions corresponding to a plurality of domains. A capsule (or domain) according to an embodiment may include a plurality of action objects (or action information) and concept object (or concept information) included in a plan. According to an embodiment, the capsule DB 1030 may store the plurality of capsules in the form of a Concept Action Network (CAN). According to an embodiment, the plurality of capsules may be stored in a function registry included in the capsule DB 1030.

The capsule DB 1030 may include a strategy registry in which strategy information necessary to determine a plan corresponding to a voice input is stored. The strategy information may include reference information for determining one plan when there are a plurality of plans corresponding to the voice input. According to an embodiment, the capsule DB 1030 may include a follow-up registry in which information of a follow-up action for suggesting the follow-up action to a user is stored in a specified situation. The follow-up action may include, for example, a follow-up utterance. According to an embodiment, the capsule DB 1030 may include a layout registry which stores layout information of information which is output through the user terminal 900. According to an embodiment, the capsule DB 1030 may include a vocabulary registry in which vocabulary information included in capsule information is stored. According to an embodiment, the capsule DB 1030 may include a dialog registry in which information on a dialog (or interaction) with a user is stored. The capsule DB 1030 may update a stored object through a developer tool. The developer tool may include, for example, a function editor for updating an action object or a concept object. The developer tool may include a vocabulary editor for updating a vocabulary. The developer tool may include a strategy editor which generates and registers a strategy for determining a plan. The developer tool may include a dialog editor which generates a dialog with the user. The developer tool may include a follow-up editor capable of activating a follow-up target and editing a follow-up utterance which provides a hint. The follow-up target may be determined based on a currently set target, a user's preference, or an environmental condition. In an embodiment, the capsule DB 1030 may also be implemented in the user terminal 900.

The execution engine 1040 of an embodiment may use the generated plan to produce a result. The end user interface 1050 may transmit the produced result to the user terminal 900. Accordingly, the user terminal 900 may receive the result, and may provide the received result to the user. The management platform 1060 of an embodiment may manage information used in the intelligent server 1000. The big data platform 1070 of an embodiment may collect data of the user. The analytic platform 1080 of an embodiment may manage a Quality of Service (QoS) of the intelligent server 1000. For example, the analytic platform 1080 may manage a processing speed (or efficiency) and component of the intelligent server 1000.

The service server 1100 of an embodiment may provide a specified service (e.g., food order or hotel reservation) to the user terminal 900. According to an embodiment, the service server 1100 may be a server operated by a third party. The service server 1100 of an embodiment may provide the intelligent server 1000 with information for generating a plan corresponding to a received voice input. The provided information may be stored in the capsule DB 1030. In addition, the service server 1100 may provide the intelligent server 1000 with result information depending on the plan.

In the integrated intelligence system described above, the user terminal 900 may provide various intelligent services to the user in response to a user input. The user input may include, for example, an input using a physical button, a touch input, or a voice input.

In an embodiment, the user terminal 900 may provide a speech recognition service through an intelligent app (or a speech recognition app) stored therein. In this case, for example, the user terminal 900 may recognize a voice input or user utterance received through the microphone, and may provide the user with a service corresponding to the recognized voice input.

In an embodiment, the user terminal 900 may perform a specified action alone or together with the intelligent server and/or the service server, based on the received voice input. For example, the user terminal 900 may execute an app corresponding to the received voice input, and may perform a specified action through the executed app.

In an embodiment, when the user terminal 900 provides a service together with the intelligent server 1000 and/or a service server, the user terminal may detect a user utterance by using the microphone 920, and may generate a signal (or voice data) corresponding to the detected user utterance. The user terminal may transmit the voice data to the intelligent server 1000 by using the communication interface 910.

The intelligent server 1000 according to an embodiment may generate a plan for performing a task corresponding to the voice input or a result obtained by performing an action depending on the plan, as a response for the voice input received from the user terminal 900. The plan may include, for example, a plurality of actions for performing a task corresponding to a user's voice input and a plurality of concepts related to the plurality of actions. The concept may be defining of a parameter which is input by the execution of the plurality of actions or a result value which is output by the execution of the plurality of actions. The plan may include association information between a plurality of actions and a plurality of concepts.

The user terminal 900 of an embodiment may receive the response by using the communication interface 910. The user terminal 900 may output a voice signal generated inside the user terminal 900 to the outside by using the speaker 930, or may output an image generated inside the user terminal 900 to the outside by using the display 940.

Figure 10:
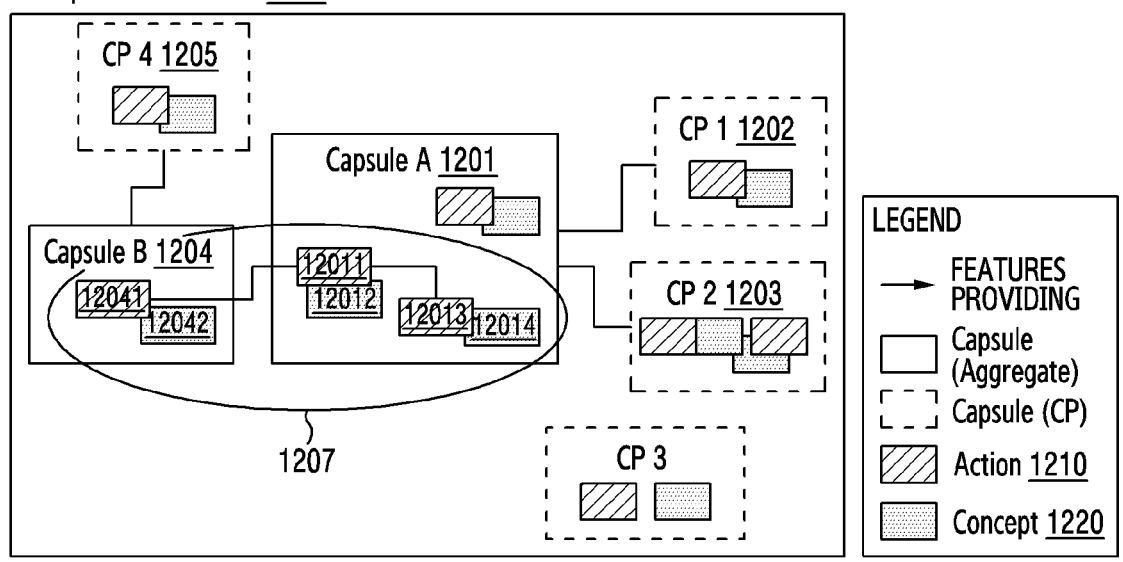
FIG. 10 illustrates a configuration in which information on a relationship between a concept and an action is stored in a database according to an embodiment of the disclosure.

FIG. 10 illustrates a configuration in which information on a relationship between a concept and an action is stored in a DB according to an embodiment of the disclosure.

Referring to FIGS. 9 and 10, a capsule DB (e.g., the capsule DB 1030) of the intelligent server 1000 may store a capsule in the form of a Concept Action Network (CAN) 1200. The capsule DB may store an action for processing a task corresponding to a user's voice input and a parameter necessary for the action in the form of the CAN 1200.

The capsule DB may store a plurality of capsules (a capsule_A 1201, a capsule B 1204) respectively corresponding to a plurality of domains (e.g., applications). According to an embodiment, one capsule (e.g., the capsule_A 1201) may correspond to one domain (e.g., a geo, an application). In addition, a single capsule may correspond to at least one service prover (e.g., a CP_1 1202 or a CP_2 1203) for performing a function for a domain related to the capsule. According to an embodiment, the single capsule may include at least one action 1210 and at least one concept 1220 for performing a specified function.

The natural language platform 1020 may generate a plan for performing a task corresponding to the received voice input by using a capsule stored in the capsule DB. For example, the planner module 1025 of the natural language platform may generate a plan by using a capsule stored in the capsule DB. For example, the plan 1207 may be generated by using actions 12011 and 12013 and concepts 12012 and 12014 of the capsule_A 1201 and an action 12041 and concept 12042 of the capsule B 1204.

Figure 11:
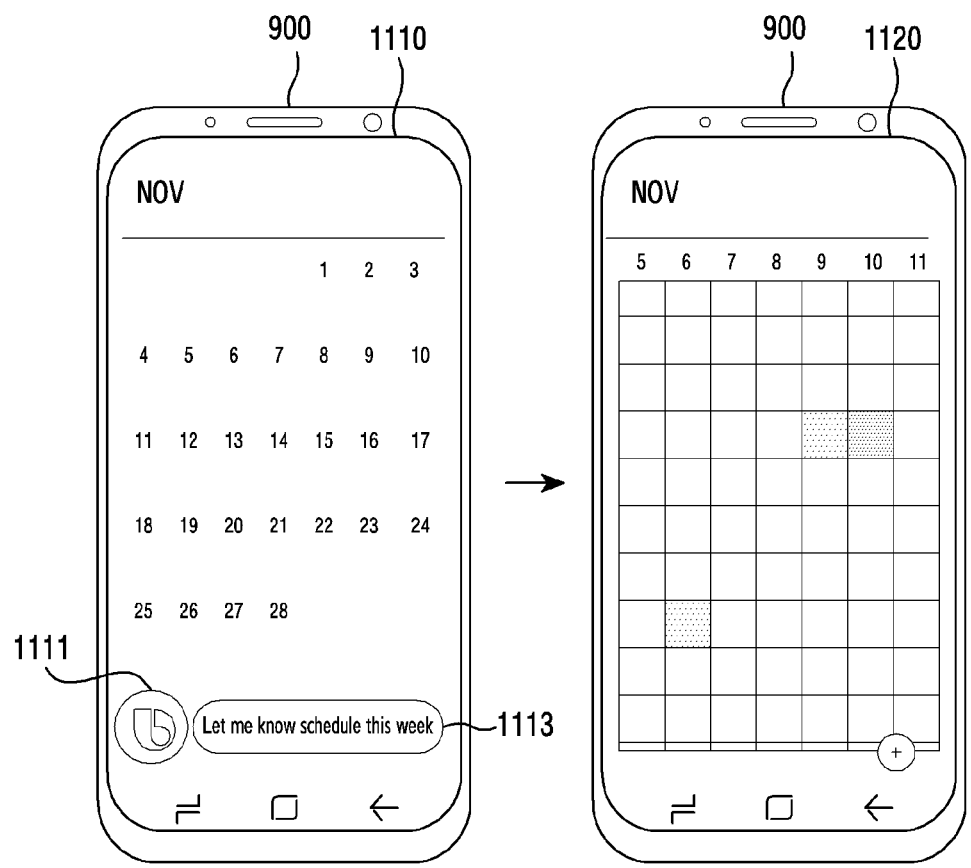
FIG. 11 illustrates a screen in which a user terminal processes a voice input received through an intelligent app according to an embodiment of the disclosure.

FIG. 11 illustrates a screen in which a user terminal processes a voice input received through an intelligent app according to an embodiment of the disclosure.

Referring to FIG. 11, the user terminal 900 may execute an intelligent app to process a user input through the intelligent server 1000.

According to an embodiment, in a screen 1110, the user terminal 900 may recognize an intelligent app for processing a voice input, upon recognizing a specified voice input (e.g., Wake up!) or receiving an input through a hardware key (e.g., a dedicated hardware key). The user terminal 900 may execute the intelligent app, for example, in a state where a schedule app is executed. According to an embodiment, the user terminal 900 may display on the display 940 an object (e.g., icon) 1111 corresponding to the intelligent app. According to an embodiment, the user terminal 900 may receive the voice input caused by a user utterance. For example, the user terminal 900 may receive a voice input "Show me the schedule of this week!". According to an embodiment, the user terminal 900 may display on the display a User Interface (UI) 1113 of an intelligent app on which text data of the received voice input is displayed.

According to an embodiment, in a screen 1120, the user terminal 900 may display on the display a result corresponding to the received voice input. For example, the user terminal 900 may receive a plan corresponding to the received user input, and may display 'a schedule of this week' on the display according to the plan.

According to various embodiments of the disclosure, an electronic device (e.g., the electronic device 101 of FIG. 1, FIG. 6A, FIG. 7, and FIG. 8A, the user terminal 900 of FIG. 9) includes: a communication module (e.g., the communication module 190 of FIG. 1, the communication interface 910 of FIG. 9); a display (e.g., the display module 160 of FIG. 1, the display 940 of FIG. 9); at least one processor (e.g., the processor 120 of FIG. 1, the processor 960 of FIG. 9) operatively coupled with the communication module and the display; and a memory (e.g., the memory 130 of FIG. 1 and FIG. 2, the memory 950 of FIG. 9) operatively coupled with the at least one processor. The memory may store instructions, when executed, causing the at least one processor to in response to a user input, recognize a user intent by analyzing the user input, execute a function and/or action corresponding to the user intent and provide an execution result through the display, store the user input in the memory, in response to a sharing request of the user input, classify a type of the user input requested to be shared, if the classification result shows that the user input requested to be shared is a user input (hereinafter, a continuous input) related to at least one previous user input pre-stored in the memory, generate execution information, based on the at least one previous user input and the user input requested to be shared, and transmit the generated execution information to at least one different electronic device (e.g., the electronic device 102 or 104 of FIG. 1, the different electronic device 602 of FIG. 6A, the different electronic device 702 of FIG. 7, the different electronic device 802 of FIG. 8A) through the communication module.

According to various embodiments, the execution information may include at least one of a capture image obtained by capturing the execution result, an instruction related to the user input requested to be shared, and link information capable of executing the instruction.

According to various embodiments, the memory may further store an instruction configured to, when the execution information is generated, generate the instruction, based on the previous user input and the user input requested to be shared, and output on the display a popup window (e.g., the popup window 66 of FIG. 6A, the popup window 76 of FIG. 7, the popup window 86 of FIG. 8A) capable of editing the generated instruction.

According to various embodiments, the continuous input may include a prompt input corresponding to additional information on the previous user input or a follow-up input for the previous user input.

According to various embodiments, the instruction which classifies the type of the user input requested to be shared may include instructions configured to classify the type into a single input if there is no previous user input or if the previous user input and the user input requested to be shared are processed by different applications, classify the type into the follow-up input if the applications are identical and if the user input requested to be shared does not correspond to the additional information, and classify the type into the prompt input if the applications are identical and if the user input requested to be shared corresponds to the additional information.

According to various embodiments, the instruction which generates the execution information may include instructions configured to, if the user input requested to be shared is the follow-up input and if a correlation with the previous user input corresponds to a change in time, position, or occasion, generate an instruction corresponding to the user input requested to be changed by replacing some texts corresponding to the time, position, or occasion among texts corresponding to the previous user input with texts corresponding to the user input requested to be shared.

According to various embodiments, the instruction which generates the execution information may include an instruction configured to, if the user input requested to be shared is the follow-up input and if a correlation with the previous user input does not correspond to a change in time, position, or occasion, generate a shortcut instruction by integrating instructions corresponding to respective user inputs.

According to various embodiments, the instruction which generates the execution information may include an instruction configured to, if the user input requested to be shared is the prompt input, generate an instruction corresponding to the user input requested to be shared by enumerating instructions corresponding to respective user inputs according to a specified rule.

According to various embodiments, the memory may further store an instruction configured to, when a shortcut instruction which executes a plurality of commands by using history information on a user input stored in the memory, if a user input selected from among the user inputs stored in the memory is the continuous input, register an instruction or shortcut instruction generated based on the selected user input and at least one previous user input related to the selected user input as an instruction of the shortcut instruction.

According to various embodiments, the user input may include at least one of an utterance input and a text input.

According to various embodiments of the disclosure, a method of sharing execution information on a user input having continuity of an electronic device (e.g., the electronic device 101 of FIG. 1, FIG. 6A, FIG. 7, and FIG. 8A, the user terminal 900 of FIG. 9) includes: in response to a user input, recognizing a user intent by analyzing the user input; executing a function and/or action corresponding to the user intent and providing an execution result through a display (e.g., the display module 160 of FIG. 1, the display 940 of FIG. 9); storing the user input in a memory (e.g., the memory 130 of FIG. 1 and FIG. 2, the memory 950 of FIG. 9); in response to a sharing request of the user input, classifying a type of the user input requested to be shared; if the classification result shows that the user input requested to be shared is a user input (hereinafter, a continuous input) related to at least one previous user input pre-stored in the memory; generating execution information, based on the at least one previous user input and the user input requested to be shared; and transmitting the generated execution information to at least one different electronic device (e.g., the electronic device 102 or 104 of FIG. 1, the different electronic device 602 of FIG. 6A, the different electronic device 702 of FIG. 7, the different electronic device 802 of FIG. 8A) through a communication module (e.g., the communication module 190 of FIG. 1, the communication interface 910 of FIG. 9).

According to various embodiments, the execution information may include at least one of a capture image obtained by capturing the execution result, an instruction related to the user input requested to be shared, and link information capable of executing the instruction.

According to various embodiments, the method may further include, when the execution information is generated, generating the instruction, based on the previous user input and the user input requested to be shared, and outputting on the display a popup window capable of editing the generated instruction.

According to various embodiments, the continuous input may include a prompt input corresponding to additional information on the previous user input or a follow-up input for the previous user input.

According to various embodiments, the classifying of the type of the user input requested to be shared may include classifying the type into a single input if there is no previous user input or if the previous user input and the user input requested to be shared are processed by different applications, classifying the type into the follow-up input if the applications are identical and if the user input requested to be shared does not correspond to the additional information, and classifying the type into the prompt input if the applications are identical and if the user input requested to be shared corresponds to the additional information.

According to various embodiments, the generating of the execution information may include, if the user input requested to be shared is the follow-up input and if a correlation with the previous user input corresponds to a change in time, position, or occasion, generating an instruction corresponding to the user input requested to be changed by replacing some texts corresponding to the time, position, or occasion among texts corresponding to the previous user input with texts corresponding to the user input requested to be shared.

According to various embodiments, the generating of the execution information may include, if the user input requested to be shared is the follow-up input and if a correlation with the previous user input does not correspond to a change in time, position, or occasion, generating a shortcut instruction by integrating instructions corresponding to respective user inputs.

According to various embodiments, the generating of the execution information may include, if the user input requested to be shared is the prompt input, generating an instruction corresponding to the user input requested to be shared by enumerating instructions corresponding to respective user inputs according to a specified rule.

According to various embodiments, the method may further include, when a shortcut instruction which executes a plurality of commands by using history information on a user input stored in the memory, if a user input selected from among the user inputs stored in the memory is the continuous input, registering an instruction or shortcut instruction generated based on the selected user input and at least one previous user input related to the selected user input as an instruction of the shortcut instruction.

According to various embodiments, the user input may include at least one of an utterance input and a text input.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication module;
a display;
at least one processor operatively coupled with the communication module and the display; and memory operatively coupled with the at least one processor, wherein the memory stores instructions, when executed by the at least one processor, causing the electronic device to:

in response to a user input, recognize a user intent by analyzing the user input, execute at least one of a function or an action corresponding to the user intent and provide an execution result through the display, store the user input in the memory, in response to a sharing request of the user input, classify a type of the user input requested to be shared, in response to a result of the classifying showing that the user input requested to be shared is a user input, which is part of a continuous input, related to a previous user input pre-stored in the memory, generate execution information, based on the previous user input and the user input requested to be shared, and in response to receiving a user input confirming the request to share, transmit, through the communication module, the generated execution information to at least one different electronic device, for display on the at least one different electronic device, wherein the generation of the execution information comprises generating the execution information based on the previous user input and the request to be share, and displaying in a popup window an editable version of the generated execution information, a user interface control configured to cancel the request to share, and a user interface control configured to confirm the request to share.

2. The electronic device of claim 1, wherein the execution information comprises at least one of a capture image obtained by capturing the execution result, execution information related to the user input requested to be shared, or link information capable of executing the execution information.

3. The electronic device of claim 1, wherein the continuous input comprises a prompt input corresponding to additional information on the previous user input or a follow-up input for the previous user input.

4. The electronic device of claim 3, wherein an instruction, of the instructions stored in memory, which classifies the type of the user input requested to be shared includes instructions configured to:

in response to there being no previous user input, or in response to different applications processing the previous user input and the user input requested to be shared; classify the type into a single input, in response to an application processing the previous user input and an application processing the user input requested to be shared being identical, and in response to the user input requested to be shared not corresponding to the additional information:

classify the type into the follow-up input, and in response to the application processing the previous user input and the application processing the user input requested to be shared being identical and in response to the user input requested to be shared corresponding to the additional information:

classify the type into the prompt input.

5. The electronic device of claim 3, wherein an instruction, of the instructions stored in memory, which generates the execution information comprises instructions configured to:

in response to the user input requested to be shared being the follow-up input and in response to a correlation with the previous user input corresponding to a change in time, position, or occasion;

generate an instruction corresponding to the user input requested to be changed by replacing some texts corresponding to the time, position, or occasion among texts corresponding to the previous user input with texts corresponding to the user input requested to be shared.

6. The electronic device of claim 3, wherein an instruction, of the instructions stored in memory, which generates the execution information comprises an instruction configured to:

in response to the user input requested to be shared being the follow-up input and in response to a correlation with the previous user input not corresponding to a change in time, position, or occasion;

generate a shortcut instruction by integrating instructions corresponding to respective user inputs.

7. The electronic device of claim 3, wherein an instruction, of the instructions stored in memory, which generates the execution information comprises an instruction configured to:

in response to the user input requested to be shared being the prompt input, generate an instruction corresponding to the user input requested to be shared by enumerating instructions corresponding to respective user inputs according to a specified rule.

8. The electronic device of claim 1, wherein the memory further stores an instruction configured to:

when a shortcut instruction which executes a plurality of commands by using history information on a user input stored in the memory, in response to a user input selected from among the user inputs stored in the memory being the continuous input:

register an instruction or shortcut instruction generated based on the selected user input and at least one previous user input related to the selected user input as an instruction of the shortcut instruction.

9. The electronic device of claim 1, wherein the user input comprises at least one of an utterance input or a text input.

10. A method of sharing execution information on a user input having continuity of an electronic device, the method comprising:

in response to a user input, recognizing a user intent by analyzing the user input;

executing at least one of a function or an action corresponding to the user intent and providing an execution result through a display;

storing the user input in a memory;

in response to a sharing request of the user input, classifying a type of the user input requested to be shared;

in response to a result of the classifying showing that the user input requested to be shared is a user input, which is part of a continuous input, related to a previous user input pre-stored in the memory, generating execution information, based on the previous user input and the user input requested to be shared; and in response to receiving a user input confirming the request to share, transmitting, through a communication module, the generated execution information to at least one different electronic device, for display on the at least one different electronic device, wherein the generating of the execution information comprises generating the execution information based on the previous user input and the request to share, and displaying in a popup window an editable version of the generated execution information, a user interface control configured to cancel the request to share, and a user interface control configured to confirm the request to share.

11. The method of claim 10, wherein the execution information comprises at least one of a capture image obtained by capturing the execution result, execution information related to the user input requested to be shared, or link information capable of executing the execution information.

12. The method of claim 10, wherein the continuous input comprises a prompt input corresponding to additional information on the previous user input or a follow-up input for the previous user input.

13. The method of claim 12, wherein the classifying of the type of the user input requested to be shared comprises:
in response to there not being previous user input, or in response to different applications processing the previous user input and the user input requested to be shared:
classifying the type into a single input,
in response to an application processing the previous user input and an application processing the user input requested to be shared being identical, and in response to the user input requested to be shared not corresponding to the additional information:
classifying the type into the follow-up input, and
in response to the application processing the previous user input and the application processing the user input requested to be shared being identical and in response to the user input requested to be shared corresponding to the additional information;
classifying the type into the prompt input.

14. The method of claim 12, wherein the generating of the execution information comprises:
in response to the user input requested to be shared being the follow-up input and in response to a correlation with the previous user input corresponding to a change in time, position, or occasion;
generating an instruction corresponding to the user input requested to be changed by replacing some texts corresponding to the time, position, or occasion among texts corresponding to the previous user input with texts corresponding to the user input requested to be shared.

15. The method of claim 12, wherein the generating of the execution information comprises:
in response to the user input requested to be shared being the follow-up input and in response to a correlation with the previous user input not corresponding to a change in time, position, or occasion;
generating a shortcut instruction by integrating instructions corresponding to respective user inputs.

16. The method of claim 12, wherein the generating of the execution information comprises;
in response to the user input requested to be shared being the prompt input:
generating an instruction corresponding to the user input requested to be shared by enumerating instructions corresponding to respective user inputs according to a specified rule.

17. The method of claim 10, further comprising:
when a shortcut instruction which executes a plurality of commands by using history information on a user input stored in the memory, in response to a user input selected from among the user inputs stored in the memory being the continuous input;
registering an instruction or shortcut instruction generated based on the selected user input and at least one previous user input related to the selected user input as an instruction of the shortcut instruction.

18. The method of claim 10, wherein the user input comprises at least one of an utterance input or a text input.

19. The electronic device of claim 1, wherein request to share comprises a request to share with the at least one different electronic device the generated execution information and an image captured from the electronic device.

20. The electronic device of claim 1, wherein the generated execution information is configured to be executed on the at least one different electronic device in response to an input of a user of the at least one different electronic device.

* * * * *